(12) United States Patent
Kazemi et al.

(10) Patent No.: US 11,694,115 B2
(45) Date of Patent: Jul. 4, 2023

(54) SYSTEM AND METHOD FOR DIACHRONIC MACHINE LEARNING ARCHITECTURE

(71) Applicant: ROYAL BANK OF CANADA, Toronto (CA)

(72) Inventors: Seyed Mehran Kazemi, Montreal (CA); Rishab Goel, Montreal (CA)

(73) Assignee: ROYAL BANK OF CANADA, Montreal (CA)

( * ) Notice: Subject to any disclaimer, the term of this patent is extended or adjusted under 35 U.S.C. 154(b) by 387 days.

(21) Appl. No.: 16/875,737

(22) Filed: May 15, 2020

(65) Prior Publication Data

US 2020/0364619 A1 Nov. 19, 2020

Related U.S. Application Data

(60) Provisional application No. 62/849,023, filed on May 16, 2019.

(51) Int. Cl.
| | |
|---|---|
| *G06N 20/00* | (2019.01) |
| *G06F 16/2458* | (2019.01) |
| *G06N 3/00* | (2023.01) |
| *G06N 3/086* | (2023.01) |

(52) U.S. Cl.
CPC ......... *G06N 20/00* (2019.01); *G06F 16/2477* (2019.01); *G06N 3/00* (2013.01); *G06N 3/086* (2013.01)

(58) Field of Classification Search
CPC .................................................. G06F 16/2477
See application file for complete search history.

(56) References Cited

U.S. PATENT DOCUMENTS

| | | | |
|---|---|---|---|
| 9,996,409 B2* | 6/2018 | Chen .................... | G06F 16/248 |
| 2019/0213260 A1* | 7/2019 | Bacarella .............. | H04L 9/0637 |
| 2020/0065668 A1* | 2/2020 | Garcia Duran ........ | G06N 5/022 |

(Continued)

OTHER PUBLICATIONS

Kutuzov, Andrey, et al. "Diachronic word embeddings and semantic shifts: a survey," Jun. 13, 2018, arXiv preprint arXiv: 1806.03537, all. (Year: 2018).*

(Continued)

*Primary Examiner* — Richard L Bowen
(74) *Attorney, Agent, or Firm* — Norton Rose Fulbright Canada LLP

(57) ABSTRACT

Systems and methods for expanding a multi-relational data structure tunable for generating a non-linear dataset from a time-dependent query. The systems include a processor and a memory. The memory may store processor-executable instructions that, when executed, configure the processor to: receive the query of the multi-relational data structure, wherein the query includes at least one entity node at a queried time relative to the time data; obtain, based on the query, a temporal representation vector based on a diachronic embedding of the multi-relational data structure, the diachronic embedding based on a combination of a first sub-function associated with a temporal feature and a second sub-function associated with a persistent feature; determine, from the temporal representation vector, at least one time-varied score corresponding to the queried time; and generate a response dataset based on the at least one time-varied score determined from the temporal representation vector.

18 Claims, 6 Drawing Sheets

(56) References Cited

U.S. PATENT DOCUMENTS

| | | | |
|---|---|---|---|
| 2020/0159795 A1* | 5/2020 | Weldemariam | G06F 16/9535 |
| 2020/0160215 A1* | 5/2020 | Kotnis | G06N 20/00 |
| 2020/0311565 A1* | 10/2020 | Beller | G06F 16/9024 |

OTHER PUBLICATIONS

Zhang, Yating, et al. "Omnia mutantur, nihil interit: Connecting past with present by finding corresponding terms across time." 2015, Proceedings of the 53rd Annual Meeting of the Assoc. for Comp. Linguistics and the 7th Int. Joint Conf. on Nat. Language Processing (vol. 1: Long Papers), all (Year: 2015).*

Rosin, Guy D., Eytan Adar, and Kira Radinsky. "Learning word relatedness over time." 2017, arXiv preprint arXiv:1707.08081, all. (Year: 2017).*

Kutuzov, Andrey, Erik Velldal, and Lilja Øvrelid. "Temporal dynamics of semantic relations in word embeddings: an application to predicting armed conflict participants," 2017 arXiv preprint arXiv:1707.08660, all. (Year: 2017).*

H.S. Carslaw, Introduction To the Theory of Fourier's Series and Integrals, Macmillan and Co., Limited, 1921.

Frank L. Hitchcock, The Expression of a Tensor or a Polyadic as a Sum of Products, Journal of Mathematics and Physics, vol. 6, Issue 1-4, pp. 164-189, Apr. 1927.

Lapedes, A. and Farber, R., Nonlinear Signal Processing Using Neural Networks: Prediction and System Modelling, IEEE International Conference on Neural Networks, 1987.

Kalev Leetaru and Philip A. Schrodt, GDELT: Global Data on Events, Location and Tone, 1979-2012, International Studies Association meetings, San Francisco, 2013.

De Raedt et al., Statistical Relational Artificial Intelligence Logic, Probability, and Computation, Synthesis Lectures on Artificial Intelligence and Machine Learning, 2016.

Ma et al.; Embedding Models for Episodic Knowledge Graphs; Dec. 2018—arXiv:1807.00228v2.

Minervini et al.; Regularizing Knowledge Graph Embeddings via Equivalence and Inversion Axioms; Machine Learning and Knowledge Discovery in Databases, pp. 668-683, 2017.

Nguyen et al.; STransE: a novel embedding model of entities and relationships in knowledge bases; Proceedings of NAACL-HLT 2016, pp. 460-466, San Diego, California, Jun. 12-17, 2016, Association for Computational Linguistics.

D. Nguyen; An overview of embedding models of entities and relationships for knowledge base completion; Mar. 2017—arXiv:1703.08098v2.

Nickel et al.; A Three-Way Model for Collective Learning on Multi-Relational Data; Proceedings of the 28th International Conference on Machine Learning, Bellevue, WA, USA, 2011.

Nickel et al.; A Review of Relational Machine Learning for Knowledge Graphs; Sep. 2015—arXiv:1503.00759v3.

Nickel et al.; Holographic Embeddings of Knowledge Graphs; Dec. 2015—arXiv:1510.04935v2.

Papai et al.; Slice Normalized Dynamic Markov Logic Networks; NIPS'12: Proceedings of the 25th International Conference on Neural Information Processing Systems—vol. 2, Dec. 2012, pp. 1907-1915.

Paszke et al.; Automatic differentiation in PyTorch; 31st Conference on Neural Information Processing Systems (NIPS 2017), Long Beach, CA, USA, 2017.

Richardson et al.; Markov Logic Networks; Machine Learning, vol. 62, No. 1-2, pp. 107-136, 2006.

Sadilek et al.; Recognizing Multi-Agent Activities from GPS Data; AAAI'10: Proceedings of the Twenty-Fourth AAAI Conference on Artificial Intelligence, Jul. 2010, pp. 1134-1139.

Socher et al.; Reasoning With Neural Tensor Networks for Knowledge Base Completion; NIPS'13: Proceedings of the 26th International Conference on Neural Information Processing Systems—vol. 1, Dec. 2013, pp. 926-934.

Sourek et al.; Lifted Relational Neural Networks; Oct. 2015—arXiv:1508.05128v2.

Sun et al.; Rotate: Knowledge Graph Embedding by Relational Rotation in Complex Space; Feb. 2019—arXiv:1902.10197v1.

Trivedi et al.; Know-Evolve: Deep Temporal Reasoning for Dynamic Knowledge Graphs; Proceedings of the 34th International Conference on Machine Learning, Sydney, Australia, PMLR 70,2017—arXiv: 1705 05742v3.

Trivedi et al.; DyRep: Learning Representations over Dynamic Graphs; International Conference on Learning Representations (ICLR 2019), May 2019.

Trouillon et al.; Complex Embeddings for Simple Link Prediction; ICML'16: Proceedings of the 33rd International Conference on International Conference on Machine Learning—vol. 48, Jun. 2016, pp. 2071-2080.

Trouillon et al.; Knowledge Graph Completion via Complex Tensor Factorization; Nov. 2017—arXiv: 1702.06879v2.

Wang et al.; Knowledge Graph Embedding by Translating on Hyperplanes; AAAI'14: Proceedings of the Twenty-Eighth AAAI Conference on Artificial Intelligence, Jul. 2014, pp. 1112-1119.

Wang et al.; Knowledge Graph Embedding: A Survey of Approaches and Applications; IEEE Transactions on Knowledge and Data Engineering, 2017.

Xu et al.; How Powerful are Graph Neural Networks?; Feb. 2019—arXiv:1810.00826v3.

Yang et al.; Embedding Entities and Relations for Learning and Inference in Knowledge Bases; Aug. 2015—arXiv:1412.6575v4.

Balažević et al.; Hypernetwork Knowledge Graph Embeddings; Oct. 2018—arXiv:1808.07018v3.

Balažević et al.; TuckER: Tensor Factorization for Knowledge Graph Completion; Jan. 2019—arXiv:1901.09590v1.

Bamler et al.; Dynamic Word Embeddings; Proceedings of the 34th International Conference on Machine Learning; Sydney, Australia; PMLR 70, 2017—arXiv: 1702.08359v2.

Bordes et al.; Translating Embeddings for Modeling Multi-relational Data; NIPS'13: Proceedings of the 26th International Conference on Neural Information Processing Systems—vol. 2; Dec. 2013; pp. 2787-2795.

Boschee et al.; ICEWS Coded Event Data; https://doi.org/10.7910/DVN/28075, Harvard Dataverse, V28, UNF:6:NOSHB7wyt0SQ8sMg7+w38w== [fileUNF]; 2015.

David Buchman et al.; Negation Without Negation in Probabilistic Logic Programming; KR'16: Proceedings of the Fifteenth International Conference on Principles of Knowledge Representation and Reasoning; Apr. 2016; pp. 529-532.

Chekol et al.; Rule Based Temporal Inference; Technical Communications of the 33rd International Conference on Logic Programming (ICLP 2017); Article No. 4; pp. 4:1-4:14; 2017.

Chekol et al.; Marrying Uncertainty and Time in Knowledge Graphs; AAAI'17: Proceedings of the Thirty-First AAAI Conference on Artificial Intelligence; Feb. 2017; pp. 88-94.

Das et al.; Go For A Walk And Arrive At The Answer: Reasoning Over Paths In Knowledge Bases Using Reinforcement Learning; Dec. 2018—arXiv:1711.05851v2.

Dasgupta et al.; HyTE: Hyperplane-based Temporally aware Knowledge Graph Embedding; Proceedings of the 2018 Conference on Empirical Methods in Natural Language Processing, pp. 2001-2011, Brussels, Belgium, Oct. 31-Nov. 4, 2018, Association for Computational Linguistics.

De Raedt et al.; ProbLog: A Probabilistic Prolog and its Application in Link Discovery; IJCAI'07: Proceedings of the 20th International Joint Conference on Artificial Intelligence; Jan. 2007; pp. 2468-2473.

Dettmers et al.; Convolutional 2D Knowledge Graph Embeddings; Jul. 2018—arXiv: 1707.01476v6.

Dong et al.; Knowledge Vault: A Web-Scale Approach to Probabilistic Knowledge Fusion; KDD'14: Proceedings of the 20th ACM SIGKDD International Conference on Knowledge Discovery and Data Mining; Aug. 2014; pp. 601-610.

Dylla et al.; A Temporal Probabilistic Database Model for Information Extraction; Proceedings of the VLDB Endowment, vol. 6, No. 14, pp. 1810-1821; 2013.

(56) References Cited

OTHER PUBLICATIONS

Fatemi et al.; Improved Knowledge Graph Embedding using Background Taxonomic Information; Dec. 2018—arXiv: 1812.032351.
Garcia-Durán et al.; Learning Sequence Encoders for Temporal Knowledge Graph Completion; Sep. 2018—arXiv: 1809.032021.
Parascandolo et al.; Taming The Waves: Sine As Activation Function In Deep Neural Networks; International Conference on Learning Representations (ICLR); 2017.
Hamilton et al.; Diachronic Word Embeddings Reveal Statistical Laws of Semantic Change; Proceedings of the 54th Annual Meeting of the Association for Computational Linguistics, pp. 1489-1501, Berlin, Germany, Aug. 7-12, 2016; Association for Computational Linguistics.
Huber et al.; Applying Markov Logic for Debugging Probabilistic Temporal Knowledge Bases; Proceedings of the 4th Workshop on Automated Knowledge Base Construction (AKBC); 2014.
Jiang et al.; Towards Time-Aware Knowledge Graph Completion; Proceedings of COLING 2016, the 26th International Conference on Computational Linguistics: Technical Papers, pp. 1715-1724; Osaka, Japan, Dec. 11-17, 2016.
Kadlec et al.; Knowledge Base Completion: Baselines Strike Back; Proceedings of the 2nd Workshop on Representation Learning for NLP, pp. 69-74, Vancouver, Canada; Aug. 3, 2017; Association for Computational Linguistics.
Kazemi et al.; Relational Logistic Regression; Proceedings of the Fourteenth International Conference on Principles of Knowledge Representation and Reasoning, pp. 548-557; 2014.
Kazemi et al.; Bridging Weighted Rules and Graph Random Walks for Statistical Relational Models; Frontiers in Robotics and AI, Feb. 2018.
Kazemi et al.; ReINN: A Deep Neural Model for Relational Learning; Dec. 2017—arXiv:1712.02831v1.
Kazemi et al.; SimplE Embedding for Link Prediction in Knowledge Graphs; Oct. 2018—arXiv:1802.04868v2.
Kim et al.; Temporal Analysis of Language through Neural Language Models; Proceedings of the ACL 2014 Workshop on Language Technologies and Computational Social Science, pp. 61-65, Baltimore, Maryland, USA, Jun. 26, 2014, Association for Computational Linguistics.
Kimmig et al.; A Short Introduction to Probabilistic Soft Logic; Proceedings of the NIPS Workshop on Probabilistic Programming: Foundations and Applications, pp. 1-4; 2012.
Kingma et al.; Adam: A Method for Stochastic Optimization; Jan. 2017—arXiv:1412.6980v9.
Kulkarni et al.; Statistically Significant Detection of Linguistic Change; Nov. 2014—arXiv:1411.3315v1.
Kumar et al.; Learning Dynamic Embeddings from Temporal Interaction Networks; Dec. 2018—arXiv: 1812.022891.
Lacroix et al.; Canonical Tensor Decomposition for Knowledge Base Completion; Proceedings of the 35th International Conference on Machine Learning, Stockholm, Sweden, PMLR 80, 2018—arXiv: 1806.07297v1.
Lao et al.; Relational Retrieval Using a Combination of Path-Constrained Random Walks; Machine Learning, 81(1):53-67, 2010.
Lao et al.; Random Walk Inference and Learning in A Large Scale Knowledge Base; Proceedings of the 2011 Conference on Empirical Methods in Natural Language Processing, pp. 529-539, Jul. 2011.
Lin et al.; Learning Entity and Relation Embeddings for Knowledge Graph Completion; Proceedings of the Twenty-Ninth AAAI Conference on Artificial Intelligence, pp. 2181-2187, 2015.
Liu et al.; Analogical Inference for Multi-Relational Embeddings; Proceedings of the 34th International Conference on Machine Learning, Sydney, Australia, PMLR 70, 2017—arXiv:1705.02426v2.
Getoor et al.; "Probabilistic Relational Models" from "Introduction to Statistical Relational Learning", Chapter 5, pp. 129-174; The MIT Press, 2007 (https://doi.org/10.7551/mitpress/7432.001.0001).
Tucker, L.R.; Some Mathematical Notes on Three-Mode Factor Analysis; Psychometrika, vol. 31(3), pp. 279-311, 1966 (https://doi.org/10.1007/BF02289464).

\* cited by examiner

SYSTEM AND METHOD FOR DIACHRONIC MACHINE LEARNING ARCHITECTURE

CROSS REFERENCE TO RELATED APPLICATIONS

This application claims priority from U.S. provisional patent application No. 62/849,023, entitled "SYSTEM AND METHOD FOR DIACHRONIC MACHINE LEARNING ARCHITECTURE" filed on May 16, 2019, the entire contents of which are hereby incorporated by reference herein.

FIELD

Embodiments of the present disclosure generally relate to the field of machine learning, and in particular to data structures for temporal knowledge graph completion.

BACKGROUND

Multi-relational data structures may be knowledge graphs. Knowledge graphs may include a combination of data structures, such as data arrays, data linked lists, data records, data objects, or the like. Knowledge graphs may include directed or non-directed data structures. Knowledge graphs may include nodes representing entities and labelled edges representing relationship types among the entities. Edges in a knowledge graph may correspond to a fact, which may be encapsulated or represented by a data object, string, array, one or more characters, or the like. Nodes and an edge representing relation among the nodes may be represented as a tuple. For example, the tuple (Mary, Liked, God Father) may be a data record that represents a head entity (e.g., Mary) and a tail entity (e.g., God Father) and a relation (e.g., Liked). An existing knowledge graph may represent a subset of all possible data records representing or associated with information.

SUMMARY

Multi-relational data structures, such as knowledge graphs, may be a combination of data structures storing relationships among data representing entities. Knowledge graphs may represent a subset of an entire dataset representing the world and, accordingly, may be considered incomplete. The present disclosure may provide systems and methods for inferring or predicting new datasets associated with real world entities based on existing data structures that may represent a subset of all possible data records.

As an illustrative example, systems described in the present disclosure may be integrated within a computing environment of a banking institution. Banking institution systems may include data records of banking services (day-to-day banking, overdraft protection products, etc.), loan services (e.g., credit card services, mortgage loans, line of credit products, etc.), investor counseling services (retirement planning services, stock trading services, etc.), or other service products (e.g., safety deposit boxes, insurance products, etc.) for customers associated with client devices. The banking institution systems may record datasets associated with the provided services, and the recorded datasets may be associated with timestamps. The record datasets may be represented in knowledge graphs. In some situations, it may be desirable to implement systems to infer or predict customer requirements along a time spectrum with increased accuracy.

For instance, systems described in the present disclosure may implement operations for knowledge graph completion to take into account that facts or sentiments associated with facts can change over time. For example, a data record identifying that a banking customer may have a tendency to carry balances via a credit account at a particular time (e.g., in the year 2000) may not be characteristic of a data record identifying that banking customer at a future point in time (e.g., in the year 2012). That particular banking customer may no longer be a student and may have secured full time employment, allowing that banking customer to pay off credit accounts within short periods of time.

As another illustrative example, Bob may have a preference for action movies in the year 2000; however, Bob's sentiments or preferences may change and Bob may instead prefer documentary films in the year 2012. As some systems may process and record data records associated with entities as if relations may have a linear relationship or may represent static info, it may be desirable to provide systems for knowledge graph completion that may conduct operations for extending machine learning embedding functions to include non-linear temporal features of facts. Data records representing non-linear relationships may include relationships that may be biased or shift over time, making predictive generation of data records representing future time periods inaccurate. Systems and methods described herein may increase the granularity or increase the comprehensiveness of data records in a computing database storing all facts of a world.

Further, systems and methods provided in the present disclosure may integrate diachronic embeddings for explicitly modelling a combination of persistent features and temporal features. In explicitly conducting operations to represent a combination of persistent features and temporal features of one or more data records, the number of learnable parameters of an embedding and machine learning model may be reduced. Further, by explicitly representing a combination of persistent features and temporal features, systems and methods described herein may reduce overfitting of temporal features of data records. In one or more aspects, the proportion of representing persistent features relative to temporal features may be determined or tuned based on one or more hyper-parameters.

In some aspects of systems and methods described herein, both entity embeddings and relation embeddings may provide hidden representations of data records. In some situations, as data records may represent relations among entities that may evolve at a lower rate or may evolve negligibly over time, it may be desirable to reduce training operations by integrating diachronic embeddings related to entities to the exclusion of diachronic embeddings related to relations.

It may be understood that embodiments of systems and methods integrating diachronic embeddings with multi-relational data structure completion operations may exhibit improved technical performance as compared to multi-relational data structure completion operations that do not integrate diachronic embeddings. Further, temporal multi-relational data structure completion operations that integrate diachronic embeddings described herein may achieve increased expressivity, thereby reducing situations related to temporal multi-relational data structure under-fitting.

Accordingly, systems and methods described herein for generating or managing multi-relational data structures tunable for generating datasets from time-dependent queries may be configured to predict or infer data records for further completing a data structure storing features or representing entities based on time-varying sentiments or features.

Because features and sentiments may shift over time, generated datasets may be described as being non-linear. For instance, Mary's preference for a particular genre of movie may shift over time in a non-linear or non-patterned manner. Predicting or inferring characteristics or features of Mary based on Mary's preference at a fixed point in time may not be desirable for predicting other features or characteristics of Mary at a future point in time.

In one aspect, the present disclosure may provide a system for managing or expanding a multi-relational data structure tunable for generating a non-linear dataset from a time-dependent query. The system may include a processor and a memory coupled to the processor. The memory stores processor-executable instructions that, when executed, configure the processor to: receive a query of the multi-relational data structure, the multi-relational data structure representing at least one tuple including entity nodes, a relation among the entity nodes, and time data associated with at least one entity node, wherein the query includes at least one entity node at a queried time relative to the time data; obtain, based on the query, a temporal representation vector based on a diachronic embedding of the multi-relational data structure, the diachronic embedding based on a combination of a first sub-function associated with a temporal feature and a second sub-function associated with a persistent feature; determine, from the temporal representation vector, at least one time-varied score corresponding to the queried time; and generate a response dataset based on the at least one time-varied score determined from the temporal representation vector.

In another aspect, the present disclosure may provide a method for managing or expanding a multi-relational data structure tunable for generating a non-linear dataset from a time-dependent query. The method includes: receiving a query of the multi-relational data structure, the multi-relational data structure representing at least one tuple including entity nodes, a relation among the entity nodes, and time data associated with at least one entity node, wherein the query includes at least one entity node at a queried time relative to the time data; obtaining, based on the query, a temporal representation vector based on a diachronic embedding of the multi-relational data structure, the diachronic embedding based on a combination of a first sub-function associated with a temporal feature and a second sub-function associated with a persistent feature; determining, from the temporal representation vector, at least one time-varied score corresponding to the queried time; and generating a response dataset based on the at least one time-varied score determined from the temporal representation vector.

In another aspect, a non-transitory computer-readable medium or media having stored thereon machine interpretable instructions which, when executed by a processor may cause the processor to perform one or more methods described herein.

In various further aspects, the disclosure provides corresponding systems and devices, and logic structures such as machine-executable coded instruction sets for implementing such systems, devices, and methods.

In this respect, before explaining at least one embodiment in detail, it is to be understood that the embodiments are not limited in application to the details of construction and to the arrangements of the components set forth in the following description or illustrated in the drawings. Also, it is to be understood that the phraseology and terminology employed herein are for the purpose of description and should not be regarded as limiting.

Many further features and combinations thereof concerning embodiments described herein will appear to those skilled in the art following a reading of the present disclosure.

DESCRIPTION OF THE FIGURES

In the figures, embodiments are illustrated by way of example. It is to be expressly understood that the description and figures are only for the purpose of illustration and as an aid to understanding.

Embodiments will now be described, by way of example only, with reference to the attached figures, wherein in the figures.

DETAILED DESCRIPTION

Figure 1:
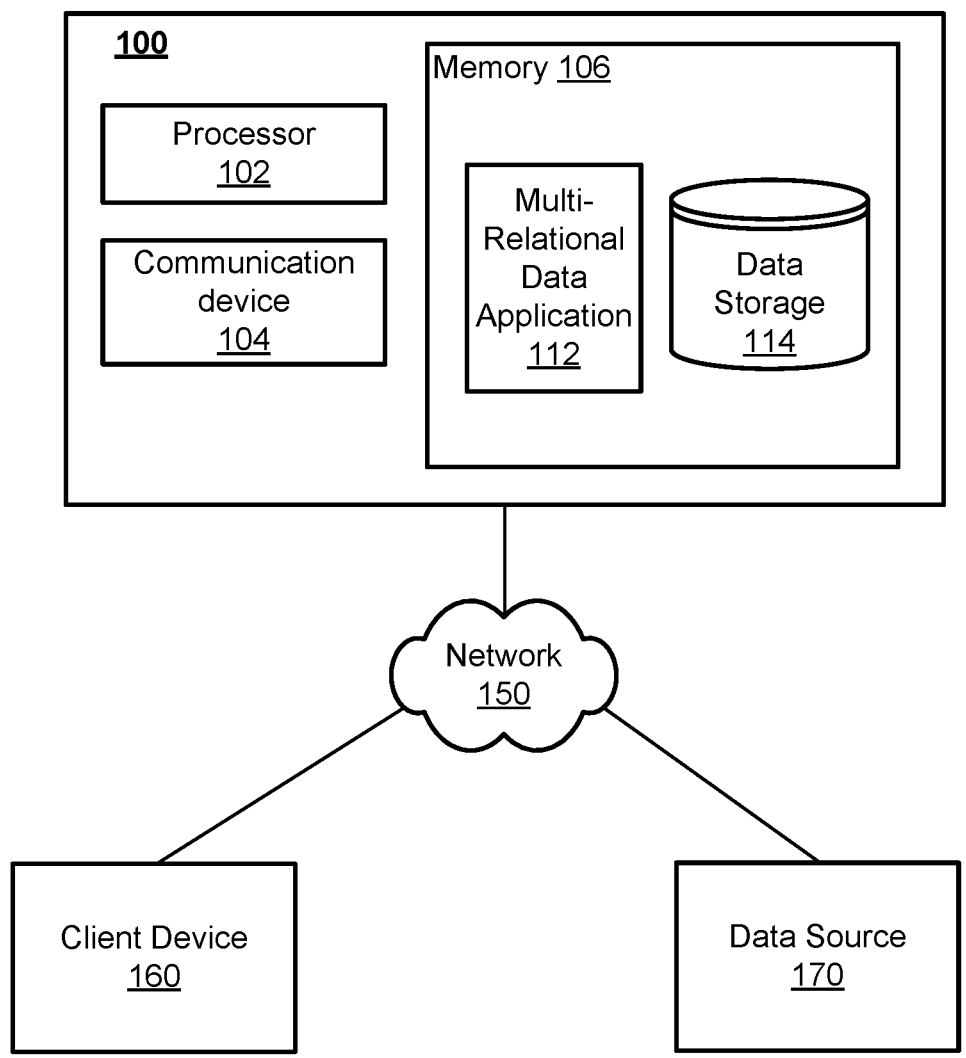
FIG. 1 illustrates a system for querying a multi-relational data structure, in accordance with an embodiment of the present disclosure.

Multi-relational data structures, such as knowledge graphs, represent facts indicating relationships among entities. Knowledge graphs may represent a subset of all facts of the world, and may be incomplete. The present disclosure may provide systems and methods including operations for inferring or predicting new facts for multi-relational data structures based on existing facts. Operations for inferring or predicting new facts may otherwise be known as knowledge graph completion.

In some examples of the present disclosure, lower-case letters may denote scalars, bold lower-case letters may denote vectors, and bold upper-case letters may denote matrices. Notation $z[n]$ may represent the $n^{th}$ element of a vector $z$, $\|z\|$ may represent the norm of the vector $z$, and $z^T$ may represent the transpose of the vector $z$.

In some examples of the present disclosure, for two vectors $z_1 \in \mathbb{R}^{d_1}$ and $z_2 \in \mathbb{R}^{d_2}$, $[z_1; z_2] \in \mathbb{R}^{d_1+d_2}$ may represent the concatenation of the two vectors. In some examples, $z_1 \otimes z_2$ may represent a vector $z \in \mathbb{R}^{d_1 d_2}$ such that $z[(n-1)*d_2+m]=z_1[n]*z_2[m]$ (e.g., the flattened vector of the tensor/outer product of the two vectors). In some examples, for $k$ vectors $z_1, \ldots, z_k$ of the same length $d$, $<z_1, \ldots, z_k> = \sum_{n=1}^{d}(z_1[n] * \ldots * z_k[n])$ may represent the sum of the element-wise product of the elements of the $k$ vectors.

In examples disclosing temporal knowledge graph completion, $\mathcal{V}$ may be a finite set of entities, $\mathcal{R}$ may be a finite set of relation types, and $\mathcal{T}$ may be a finite set of timestamps. In some examples, $\mathcal{W} \subset \mathcal{V} \times \mathcal{R} \times \mathcal{V} \times \mathcal{T}$ may represent a set of all temporal tuples $(v, r, u, t)$ that are facts (e.g., true in a world), where $v, u \in \mathcal{V}$, $r \in \mathcal{R}$, and $t \in \mathcal{T}$. In some examples, $\mathcal{W}^c$ may be the complement of $\mathcal{W}$.

In some examples, a temporal knowledge graph (KG) $\mathcal{G}$ may be a subset of $\mathcal{W}$ (e.g., $\mathcal{G} \subset \mathcal{W}$). In some examples, temporal knowledge graph completion (TKGC) may include operations for inferring $\mathcal{W}$ from $\mathcal{G}$.

In some examples of the present disclosure, a relation r may be symmetric if $(v, r, u, t) \in \mathcal{W} \Leftarrow (u, r, v, t) \in \mathcal{W}$ and anti-symmetric if $(v, r, u, t) \in \mathcal{W} \Leftarrow (u, r, v, t) \in \mathcal{W}^c$. In some examples, a relation $r_i$ may be the inverse of another relation $r_j$ if $(v, r_i, u, t) \in \mathcal{W} \Leftarrow (u, r_j, v, t) \in \mathcal{W}$. $r_i$ entails $r_j$ if $(v, r_i, u, t) \in \mathcal{W} \Rightarrow (v, r_j, u, t) \in \mathcal{W}$.

In some embodiments, a knowledge graph entity embedding, EEMB: $\mathcal{V} \rightarrow \psi$, may be a function which maps every entity $v \in \mathcal{V}$ to a hidden representation in $\psi$ where $\psi$ is the class of non-empty tuples of vectors and/or matrices. For example, EEMB (Mary)=$(z_{Mary})$ or EEMB (SR)=$(z_{SR})$ may be entity embeddings, where $z_{Mary}$ or $z_{SR}$ may be vectors of size d corresponding to the (hidden) features of the respective entities in the knowledge graph. A knowledge graph relation embedding, REMB: $\mathcal{R} \rightarrow \psi$, may be defined similarly. In some examples of the present disclosure, the hidden representation of an entity may be referred to as the embedding of entity and the hidden representation of the relation may be referred to as the embedding of the relation.

In some examples, a knowledge graph embedding model may define: (1) the EEMB and/or RRMB functions; or (2) a score function that may receive EEMB and REMB as inputs and may provide a score for a given tuple. In some examples, parameters of hidden representations may be learned from data sets.

Some examples described in the present disclosure may be based on one or more knowledge graph embeddings and/or temporal knowledge graph embeddings outlined below. A score for a tuple may be represented by $\phi(.)$. As will be described in the present disclosure, one or more knowledge graph completion operations may be based on embodiments of diachronic embeddings of the present disclosure to provide desirable features for addressing challenges of knowledge graph completion operations not based on diachronic embeddings described herein.

As will be described herein, embodiments of diachronic embeddings may be model-agnostic, and may be extended or transformed to a knowledge graph completion model by replacing an existing entity embedding function with an embodiment of a diachronic entity embedding.

In an example of TransE (static) [4] EEMB(v)=$(z_v)$ for every $v \in \mathcal{V}$ where $z_v \in \mathbb{R}^d$, REMB(r)=$(z_r)$ for every $r \in \mathcal{R}^d$ where $z_r \in \mathbb{R}^d$, and $\phi(v, r, u) = -\|z_v + z_r - z_u\|$.

In an example of DistMult (static) [65], the embeddings may be the same EEMB and REMB as TransE but DistMult may define $\phi(v, r, u) = <z_v, z_r, z_u>$.

In an example of Tucker (static) [61, 2], the embeddings may be the same EEMB and REMB as TransE but Tucker may define $\phi(v, r, u) = <w, z_v \otimes z_r \otimes z_u>$ where $\mathcal{W} \in \mathbb{R}^{d^3}$ is a weight vector shared for all tuples.

In an example of RESCAL (static) [46], the embeddings may be the same EEMB as TransE but RESCAL may define REMB(r)=$(Z_r)$ for every $v \in \mathcal{V}$ where $Z_r \in \mathbb{R}^{d \times d}$, and may define $\phi(v, r, u) = z_v^T Z_r z_u$.

In an example of Canonical Polyadic (CP) (static) [21], the embeddings may be the same REMB as TransE but defining EEMB(v)=$(z_v, \hat{z}_v)$ for every $v \in \mathcal{V}$ where $z_v, \hat{z}_v \in \mathbb{R}^d$. $z_v$ may be used when v is the head and $\hat{z}_v$ may be used when v is the tail. In CP, $\phi(v, r, u) = <z_v, z_r, \hat{z}_u>$. DistMult may be a special case of CP where $z_v = \hat{z}_v$ for every $v \in \mathcal{V}$.

In an example of SimplE (static) [27], noticing an information flow challenge between the two vectors $z_v$ and $\hat{z}_v$ of an entity V in CP, SimplE may take advantage of the inverse of the relations changing the relation embeddings to REMB(r)=$(z_r, \hat{z}_r)$ for every $r \in \mathcal{R}$, where the added vector $\hat{z}_r \in \mathbb{R}^d$ may be considered the embedding of the inverse of r. In SimplE, $\phi(v, r, u)$ may be defined as the average of two CP scores: 1-$<z_v, z_r, \hat{z}_u>$ corresponding to the score for (v, r, u) and 2-$<\hat{z}_v, \hat{z}_r, \hat{z}_u>$ corresponding to the score for $(u, r^{-1}, v)$, where $r^{-1}$ represents the inverse of r. A similar extension of CP has been proposed in [35].

In an example of TTransE (temporal) [23], the embeddings may be an extension of TransE by adding one more embedding function mapping timestamps to hidden representations: TEMB(t)=$(z_t)$ for every $t \in \mathcal{T}$ where $z_t \in \mathbb{R}^d$. In TTransE, $\phi(v, r, u, \bar{t}) = -\|z_v + \hat{z}_r + z_t - z_u\|$.

In an example of HyTE (temporal) [11], the embeddings may be another extension of TransE by defining their embedding functions similarly as TransE but defining $\phi(v, r, u, t) = -\|\bar{z}_v, \bar{z}_r - \bar{z}_u\|$ where $\bar{z}_x = z_x - z_t^T z_x z_t$ for $x \in \{v, r, u\}$. Intuitively, HyTE first projects the head, relation, and tail embeddings to the space of the timestamp and then applies the TransE function on the projected embeddings.

In an example of ConT (temporal) [42], Ma et al. [42] extends several static KG embedding models to TKGC. Their best performing model, ConT, may be an extension of Tucker defining TEMB(t)=$(z_t)$ for every $t \in \mathcal{T}$ where $z_t \in \mathbb{R}^d$ and changing the score function to $\phi(v, r, u, t) = <z_r, z_v \otimes z_r [z_u]>$. ConT may replace the shared vector $\mathcal{W}$ in Tucker with timestamp embeddings $z_t$.

In an example of TA-DistMult (temporal) [17], the embeddings may be an extension of DistMult where each character c in the timestamps is mapped to a vector (CEMB (c)=$z_c$) where $z_c \in \mathbb{R}^d$. Then, for a tuple (v, r, u, t), a temporal relation may be created by considering r and the characters in t as a sequence and an embedding $z_{r,t}$ is computed for this temporal relation by feeding the embedding vectors for each element in the sequence to an LSTM. $\phi(v, r, u, t) = <z_v, z_{r,t}, z_u>$. In some examples, they also apply TransE but DistMult may perform better.

Multi-relational data structures may include knowledge graphs representing facts indicating relationships among entities. For example, a knowledge graph may be a directed graph where nodes represent entities and labelled edges represent relationship types among the entities. In some embodiments, the knowledge graph may include a combination of directed and undirected relations. For ease of exposition, embodiments in the present disclosure may be described with reference to examples of real-world entities and relationships between the real-world entities. For a fact "Alice Liked Pulp Fiction" (e.g., directed relation) or "Mary Married Bob", the entities may be "Alice", "Pulp Fiction", "Mary", and Bob, and the relations may be "Liked" and "Married". It may be understood that embodiments of the present disclosure may also be directed to and implemented for multi-relational graphs representing relations among non-real world entities, such as a relation between two or more words in a sentence, a relation between two or more extracted scenes from a multimedia clip, or the like.

A respective edge in a knowledge graph may correspond to a fact, and the fact may be represented as a tuple, such as (Mary, Liked, God Father). Mary and God Father may be the head and tail entities, respectively, and Liked may be the relation. An example knowledge graph may have the following set of facts represented as a set of tuples:

{(Mary, Liked, ShawshankRedemption(SR)),
   (Mary, Liked, PulpFiction(PF)),
 (Alice, Liked, ShawshankRedemption(SR)),
   (Alice, Liked, PulpFiction(PF)),
   (Alice, Liked, GodFather(GF)), Bob, Liked, TheLittleMermaid(TLM)),
(Mary, Married, Bob),
. . . ,
(Mary, Liked, InsideOut(IO)),
(Mary, Liked, Zootopia(ZO))}

The above example set of tuples may represent an incomplete set of data records representing facts, or a subset of all possible data records representing any possible fact in a world. It may be desirable to conduct knowledge graph completion operations for predicting new data records or data structures representing facts based on existing tuples or data records collectively providing or representing the knowledge graph. Because Alice and Mary both liked the movies Pulp Fiction and Shawshank Redemption, knowledge graph completion operations may predict or infer that Mary may also like the movie God Father, a new predicted fact represented by a tuple (Mary, Liked God Father).

In some embodiments, knowledge graph completion may include operations for mapping each entity and/or each relation type to a hidden representation. Operations may also include computing a score for each tuple by applying a score function to the one or more representations. Examples of mappings or scoring functions for querying a multi-relational data structure are described in the present disclosure.

To illustrate knowledge graph embeddings, operations based on DistMult [64] may be illustrative. Let $z_{Mary}$, $z_{Bob}$, $z_{SR}$, $z_{PF}$, $z_{GF}$, $z_{TLM}$, $z_{IO}$, $z_{ZO}$, $z_{Liked}$, $z_{Married} \in \mathbb{R}^d$ be vectors of size d corresponding to hidden features of entities and relations in the knowledge graph. Elements of these vectors may be learned based on optimization operations such that for any tuple, such as (Mary, Liked, SR), the sum of the element-wise product of $z_{Mary}$, $z_{Liked}$ and $z_{SR}$ representing a score may be larger than a score associated with tuples not represented in the knowledge graph.

If Mary likes the movie God Father (GF), the sum of the element-wise product of $z_{Mary}$, $z_{Liked}$ and $z_{GR}$ may be a large number. And if Mary does not like GF, the sum of the element-wise product of $z_{Mary}$, $z_{Liked}$ and $z_{GR}$ may be a relatively smaller number (or a negative number).

In some embodiments, multi-relational data structures, such as knowledge graphs, may represent temporal facts indicating relationships among entities at different times. As a temporal knowledge graph may represent a subset of all facts that are true in a world, in some examples, it may be desirable to infer or predict new facts at a queried point in time based on known or existing facts along a temporal continuum.

To represent temporal aspects of facts represented in the knowledge graph, in some examples, knowledge graph edges may be associated with a date stamp, timestamp (e.g., May 2019 at 9:12 am) or time interval/duration (e.g., year 2001). The tuple (Mary, Liked, GodFather, 1995) may represent a fact that "Mary Liked God Father" in 1995. In some situations, knowledge graph embedding models may include operations based on static knowledge graphs to the exclusion of operations for assessing temporal aspects of facts. Because facts or sentiments associated with the facts can change over time, it may be desirable to provide systems and methods of knowledge graph completion directed to extending embedding functions to include temporal features of facts.

In some examples, systems and methods may be provided to extend knowledge graph completion operations and embedding functions to include timestamps or time intervals [22, 10, 41, 17]. Such embedding functions may include operations for computing a hidden representation for timestamps and for extending the score functions to utilize timestamp representations as well as entity and relation representations.

To illustrate multi-relational data structures with temporal facts, a knowledge graph may have the following example set of facts represented as a set of tuples:
{(Mary, Liked, SR, -1995),
(Mary, Liked, PF,, -1995),
(Alice, Liked, SR,,1995),
(Alice, Liked, PF,1994),
(Alice, Liked, GF,1995),
(Bob, Liked, TLM,,2000),
(Mary, Married, Bob,2002),
. . . ,
(Mary, Liked, IO,2017),
(Mary, Liked, ZO,2018)}

To provide a score for a predicted or inferred new tuple (Mary, Liked, GF, 1995), learning operations may be conducted to provide a feature vector for each entity and to provide a feature vector for each timestamp. Learning operations may provide a vector $z_{1995}$ representing features of the year 1995 and a score function may include a score portion associated with the vector $z_{1995}$. Operations may include computing the sum of the element-wise product of $z_{Mary}$, $z_{Liked}$, $z_{GR}$, and $z_{1995}$ as an extension of score functions described in the foregoing examples.

However, operations for providing a score based predominantly on features represented at a fixed point in time may be misleading because Mary's personality and sentiment towards GF may be different in 1995 as compared to a present time. Mary's personality and/or sentiment may change over time. To provide a score for the tuple (Mary, Liked, GF, 1995), the systems may determine features of Mary and GF in 1995. But operations for learning a static representation of each entity may not be optimal because static representations may only capture entity features at a single time (or an aggregation of entity features during time). With modeling or learning operations being based on features at a static time, the foregoing example operations may not adequately infer or predict features of Mary and GF at any other time on a time spectrum. Systems and methods of computing a score taking into account entity features that may change over time may be desirable.

Example systems have been implemented with a goal towards extending static knowledge graph embeddings with time features to provide temporal knowledge graph embeddings. In one example, a knowledge graph completion approach may include operations of statistical relational AI (StaRAI) [50, 31]. The example approaches may be based on soft rules [51, 13, 28, 24] where the probability of a world is typically proportional to the number of rules that are satisfied/violated in that world and the confidence for each rule. In some situations, operations combine a stack of soft rules with embeddings for property prediction [54, 26]. In some situations, operations extend the soft rules to temporal KGs [52, 48, 15, 21, 8, 9]. The approaches based on soft rules may generally perform less optimally as compared to other KG embedding models [45].

In some examples, operations of a Graph Walk may be conducted. In some situations, operations may define weighted template walks on a knowledge graph and determine answers to queries by template matching [35, 36, 11]. In some situations, the operations may be similar to, and in some cases subsumed by, the models based on soft rules [25].

In some examples, models may be developed for static knowledge graph embedding. A class of the models may include translational approaches corresponding to different variations of TransE (see, e.g., [39, 62, 43]). Another class of approaches may be based on a bilinear score function $z_v Z_r z_u$ with different approaches imposing different sparsity constraints on the $Z_r$ matrices corresponding to the embedding of the relations (see, e.g., [47, 59, 46, 27, 40]). Another example of models may be based on deep learning approaches using feed-forward or convolutional layers on top of the embeddings (see, e.g., [53, 14, 12, 1]). Any of these models may be potentially extended to TKGC through diachronic embeddings to be described in the present disclosure.

In some examples, systems have extended static knowledge graph embedding models to temporal knowledge graphs by adding an embedding of timestamp into a score function. In one example implementation [22], TransE may be extended by adding an embedding of one or more timestamps into a score function. [10] extends TransE by projecting the embeddings to the timestamp hyperplain and using the TransE score on the projected space. [41] extends several models by adding a timestamp embedding to the score function. In some situations, these example models may not be desirable when the number of timestamps is large, especially if the number of tuples or fact representations per timestamp is low. For example, a temporal knowledge graph including timestamps in the order of seconds may only include a few (e.g., 2 or 3) events occurring at each timestamp. These models may not include sufficient data to provide a good embedding for each of the respective timestamps.

Further, operations of some embedding models may have large memory requirements, as storing an embedding vector for many fine-grained timestamps may be memory intensive. For example, embedding models, such as ConT or TA-DistMult, may have computing memory requirements that scale as a function of vector size (d). For example, memory requirements associated with operations of TA-DisMult may grow by a square of the vector size d or operations of ConT may grow by the cube of the vector size d. Systems and methods including operations for knowledge graph completion based on embeddings having temporal components with reduced memory scale requirements may be desirable.

In some situations, systems and methods may conduct operations to utilize coarse-grain timestamps. However, utilizing coarse-grain timestamps may lead to loss of useful information. Furthermore, because these models learn embeddings based on observed timestamps, the models may be unable to generalize to unseen timestamps. For example, consider a temporal knowledge graph with daily timestamps from Jan. 1, 2010 to Jan. 1, 2020. Further, consider a situation where the knowledge graph does not include tuples or data for a particular date such as May 4, 2018. These models may not provide an embedding output for the date May 4, 2018 and may be unable to infer or predict tuples or data associated with this date. Systems and methods of the present disclosure provide operations of models for determining extractions of the knowledge graph for unseen timestamps.

In some examples, approaches in some systems [17] may extend TransE and DistMult to include temporal aspects by combining the relation and timestamp through a character LSTM. Using an LSTM may increase the time complexity of making predictions quadratic in nature in the embedding dimension. In systems and methods of the present disclosure, operations are provided such that time complexity may grow linearly with the embedding dimension. The disclosure that follows provides a performance comparison of the various example models.

Operations of diachronic embeddings described in the present disclosure may be akin to determining how word meanings evolved over time (e.g., via diachronic word embeddings). With diachronic word embeddings, a corpus may be temporally divided into groups (e.g., 20-year chunks of a 200-year corpus), and embeddings may be learned for words in each chunk to provide word embeddings that may be a function of time (see, e.g., [29, 32, 19, 3]). Systems and methods including operations of an entity embedding function that provide entity characteristics or relation characteristics at any discrete or point in time may be desirable.

Systems and methods described in the present disclosure include operations of embedding functions/models for temporal knowledge graph completion. The operations may include providing a score based at least on a combination of temporal features and persistent features. For example, temporal features may shift over time (e.g., changing sentiment) and persistent features may not change (e.g., a person's birth date) over time. In some embodiments, operations may include receiving an entity representation and a timestamp and determining a hidden representation associated with that entity over time based on an embedding.

In some embodiments of the present disclosure, described embedding operations may be known as diachronic embedding. Diachronic embeddings may be model-agnostic. In some embodiments, an existing static knowledge graph embedding model may be extended or transformed to a temporal knowledge graph completion model by replacing an existing entity embedding function with embodiments of diachronic entity embeddings described in the present disclosure. For instance, combining diachronic embeddings with SimplE may provide an expressive model for temporal knowledge graph completion. In some situations, the combination of diachronic embeddings with SimplE may be more expressive than with SimplE alone or with other existing embedding models. Experiments described herein for illustrating features of diachronic embeddings were conducted with subsets of data of the ICEWS [5] and GDELT [38] datasets and are described herein.

As disclosed herein, some entity embeddings for static knowledge graph completion may provide a hidden representation as output based primarily or solely on an entity representation as input. Further, embedding functions may provide a score based on features of an entity at a queried point in time. Some embedding functions may extend embedding functions simply by determining a hidden representation of timestamps and combining the hidden representation of timestamps with hidden representations of entities or relations. However, such a combination may not be adequate for temporal knowledge graph completion.

In some embodiments of the present disclosure, a diachronic entity embedding, DEEMB: $(\mathcal{V}, \mathcal{T}) \rightarrow \psi$, may be a function which maps a respective pair $(v, t)$, where $v \in \mathcal{V}$ and $t \in \mathcal{T}$, to a hidden representation in $\psi$, where $\psi$ is the class of non-empty tuples of vectors and/or matrices. In the description that follows, diachronic embeddings may be described with examples of diachronic entity embeddings. It may be understood that diachronic embeddings may also be applicable to relations to provide diachronic relation embeddings.

A diachronic embedding may be based on a combination of a first embedding sub-function associated with temporal features and a second embedding sub-function associated with persistent features. An output of a diachronic embedding function may include a tuple of vectors. For example, let $z_v^{t} \in \mathbb{R}^d$ be a vector of DEEMB(v, t) (e.g., DEEMB(v, t)=( ..., $z_v^t$, ... )). Then, $z_v^t$ may be defined as:

$$z_v^t[n] = \begin{cases} a_v[n]\sigma(w_v[n]t + b_v[n]), & \text{if } 1 \leq n \leq \gamma d. \\ a_v[n], & \text{if } \gamma d < n \leq d. \end{cases} \quad (1)$$

where $a_v \in \mathbb{R}^d$ and $w_v$, $b_v \in \mathbb{R}^{\gamma d}$ are (entity-specific) vectors with learnable parameters and a may be an activation function.

As entities may have: (i) temporal features that change over time and/or (ii) persistent features that remain fixed, the first γd elements of the vector in equation (1) may be associated with temporal features, and the remaining d−γd elements may be associated with persistent features. 0≤γ≤1 may be a hyper-parameter controlling the percentage or proportion of temporal features relative to the number of temporal and persistent features. While persistent features can be obtained by setting some elements of $w_v$ to zero, in some embodiments, it may be desirable to explicitly model persistent features to reduce the number of learnable parameters and reduce overfitting of temporal signals.

By learning $w_v$s and $b_v$s the systems may include learning operations for enabling or disabling entity features at different points in time (or at different rates) such that temporal knowledge graph predictions may be made for a particular entity at any time along a time spectrum. In Equation (1), $a_v$s may be an element for controlling importance of entity features.

In some embodiments, the activation function in Equation (1) may be the sine function. The sine function may model more than one sequence of on and off states. In some other embodiments, the activation function for Equation (1) may be include other functions, such as the sigmoid function, Tanh function, or other functions. In some scenarios, as embodiments may integrate non-linear activation functions, outputs of the diachronic embeddings may be described as non-linear, thereby providing non-linear datasets representing features of example entities and/or relations.

Reference is made to FIG. 1, which illustrates a system 100, in accordance with an embodiment of the present disclosure. The system 100 may transmit and/or receive data to/from a client device 160 or a data source 170 via a network 150. The network 150 may include a wired or wireless wide area network (WAN), local area network (LAN), or other types of networks for transmitting or receiving data.

As an illustrating example, the system 100 may be a back-end system of a banking institution for processing customer data for providing knowledge graph representations of the customer data and for conducting operations to infer or predict facts associated with customer behaviour or other facts associated with customers. For example, the system 100 may be configured to run analysis on customers based on credit card transactions (e.g., Visa™ card transactions) and the time of the respective transactions. The transactions may be viewed as a temporal knowledge graph where entities may be customers and/or companies and temporal edges may represent purchase, subscription, or other types of relations. Some customers may have Visa™ credit cards issued by other banking institutions, and the system 100 of a particular banking system may want to infer transactions conducted by customers using Visa™ credit cards issued by the other banking institutions before conducting analysis of an aggregate of all customer Visa™ card transactions. Accordingly, the example system 100 may include a trained machine learning model for generating data representing such example transactions for completing a data array that provides a more complete listing of Visa™ related transactions of a given customer, irrespective of what banking institution may be associated with the Visa™ card. As will be illustrated herein, the system 100 may be configured to query other scenarios of knowledge graph representations.

The system 100 includes a processor 102 configured to implement processor readable instructions that, when executed, configure the processor 102 to conduct operations described herein. For example, the system 100 may be configured to conduct operations for querying a multi-relational data structure or for training a machine learning model based on dataset input. Other operations may be contemplated.

In some embodiments, the system 100 may receive, from the client device 160, a query of a multi-relational data structure and may provide a response to the query based on diachronic embeddings of the multi-relational data structure. For instance, the client device 160 may be associated with a user, and the user may submit via the client device 160 a query to predict information based on known facts represented in a multi-relational data structure, such as a knowledge graph. In some embodiments, queries may be associated with machine learning operations for building out or constructing the knowledge graph based on a baseline set of facts.

In some embodiments, the system 100 may receive, from the data source 170, datasets provided as sets of tuples representing facts of the world. The received datasets may be stored in the data storage 114 of the memory 106. The data source 170 may be an external data storage device or an external originator of data sets.

The system 100 may include a communication device 104 to communicate with other computing devices, to access or connect to network resources, or to perform other computing applications by connecting to a network 150 (or multiple networks) capable of transmitting and/or receiving data. In some embodiments, the network 150 may include the Internet, Ethernet, public switch telephone network, integrated services digital network, digital subscriber line, coaxial cable, fiber optics, satellite, mobile, wireless (e.g. WMAX), SS7 signaling network, fixed line, local area network, wide area network, or other types of signaling infrastructure systems or methods. In some examples, the communication device 104 may include one or more busses, interconnects, wires, or circuits. The communication device 104 may provide an interface for communicating data between components of a single device or circuit.

The system 100 may include memory 106. The memory 106 may include one or a combination of computer memory, such as static random-access memory, random-access memory, read-only memory, electro-optical memory, magneto-optical memory, erasable programmable read-only memory, and electrically-erasable programmable read-only memory, Ferroelectric RAM, or the like.

The memory 106 may store a multi-relational data application 112 including processor readable instructions for conducting operations described herein. In some examples, the multi-relational data application 112 may include operations for querying multi-relational data structures (e.g., directed knowledge graphs) or for learning parameters associated with embeddings or hidden representations associated with machine learning operations. Other operations of the machine learning application 112 may be contemplated.

The system 100 may include the data storage 114. In some embodiments, the data storage 114 may be a secure data store. In some embodiments, the data storage 114 may store data in the form of data matrices. The data matrices may store tuples representing data, diachronic embedding output, such as hidden representations, or other datasets described in the present disclosure.

The client device 160 or the data source 170 may be a computing device including a processor, memory, and a communication device. In some embodiments, the client device 160 may be associated with a user, and the client device 160 may be configured to receive input from the user.

The client device 160 or the data source 170 may be a computing device associated with the network 150. The computing device may be connected to the network 150 and may transmit one or more datasets to the system 100. For example, the client device 160 or the data source 170 may transmit data or receive data from the system 100, and the system 100 may be configured to conduct example operations described herein.

The processor of the system 100, the client device 160, or the data source 170 may be a microprocessor or microcontroller, a digital signal processing processor, an integrated circuit, a field programmable gate array, a graphics processing unit, a reconfigurable processor, combinations thereof, or the like. The memory of any one of the system 100, the client device 160, or the data source 170 may be located internally or externally such as, for example, random-access memory, read-only memory, compact disc read-only memory, electro-optical memory, magneto-optical memory, erasable programmable read-only memory, and electrically-erasable programmable read-only memory, or the like.

The system 100, the client device 160, or the data source 170 may include an I/O interface that may enable interconnection with one or more input devices, such as a keyboard, mouse, camera, touch screen, a microphone, or with one or more output devices such as a display screen or a loudspeaker.

Referring again to the system 100, the multi-relational data application 112 may include processor executable instructions that, when executed, configure the processor to query multi-relational data structures based on diachronic embeddings.

Figure 2:
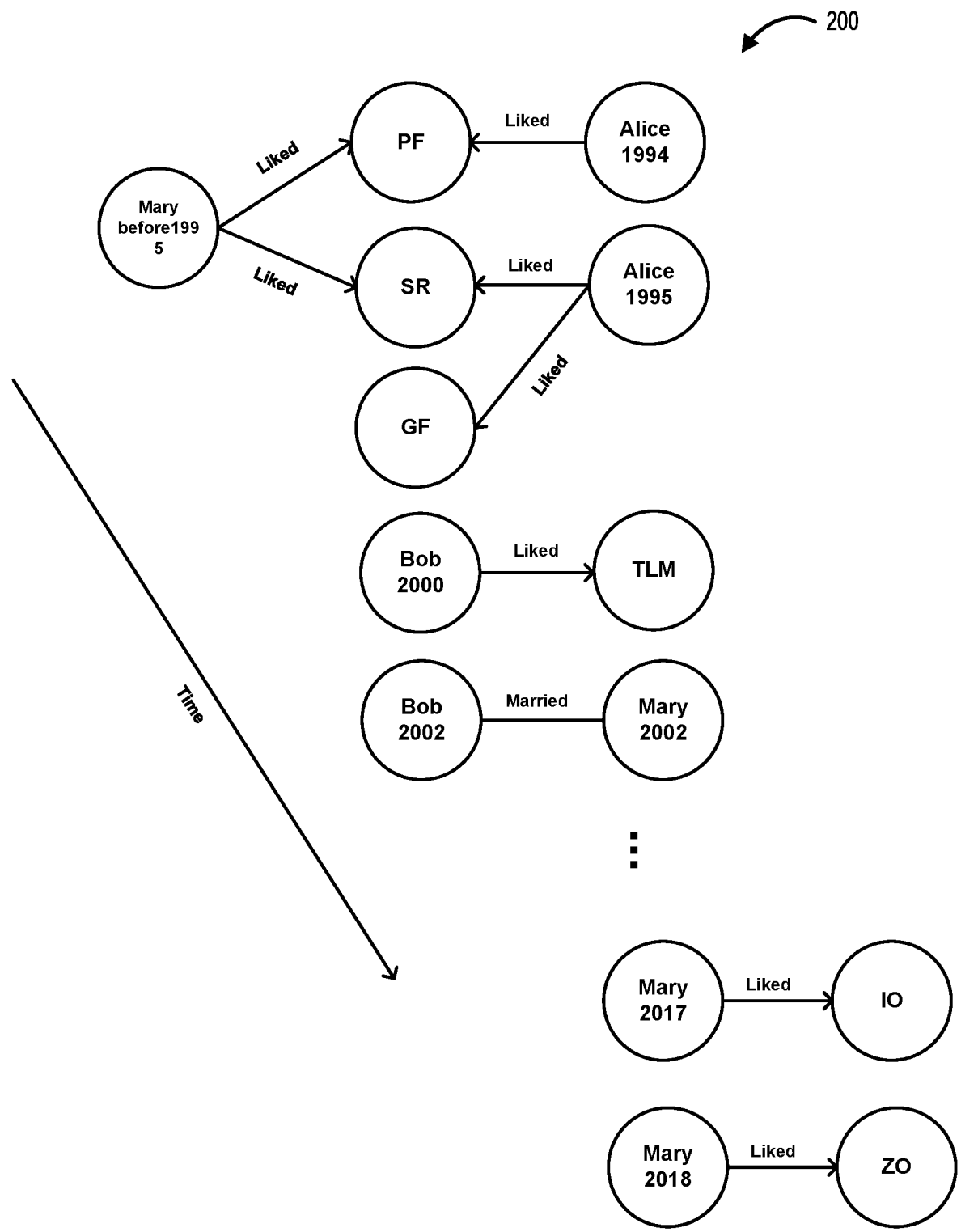
FIG. 2 illustrates a temporal knowledge graph, in accordance with an embodiment of the present disclosure.

Reference is made to FIG. 2, which illustrates a temporal knowledge graph 200, in accordance with an embodiment of the present disclosure. The temporal knowledge graph 200 may be an example multi-relational data structure representing one or more tuples, where the one or more tuples may represent temporal facts:

{(Mary, Liked, SR, -1995),
(Mary, Liked, PF,, -1995),
  (Alice, Liked, SR,,1995),
  (Alice, Liked, PF,1994),
  (Alice, Liked, GF, 1995),
  (Bob, Liked, TLM,,2000),
(Mary, Married, Bob,2002),
  . . . ,
  (Mary, Liked, IO,2017),
  (Mary, Liked, ZO,2018)}

Respective tuples may include entity nodes, a relation among the entity nodes, and time data associated with at least one entity node. For instance, in the above example of (Mary, Liked, SR, -1995), the entity nodes may be "Mary" and "SR", the relation may be "Liked" and may be among "Mary" and "SR", and the time data may represent "prior to 1995".

The temporal knowledge graph 200 may include a combination of directed tuples and/or undirected tuples. For instance, the tuple (Mary, Liked, SR, -1995) may be a directed tuple representing that Mary liked the movie Shawshank Redemption before 1995; and that the reverse isn't necessarily a relationship that is represented. The tuple Mary married Bob in 2002 may be an undirected tuple at least because both "Mary married Bob in 2002" and "Bob married Mary in 2002" may be facts. It may be understood that the illustrated knowledge graph in FIG. 2 is an example, and that the knowledge graph may be illustrated in other ways and may include other graphical notation for representing fact tuples. Further, a response dataset described in the present disclosure may also be in the form of a data tuple, data structure, or the like.

Figure 3:
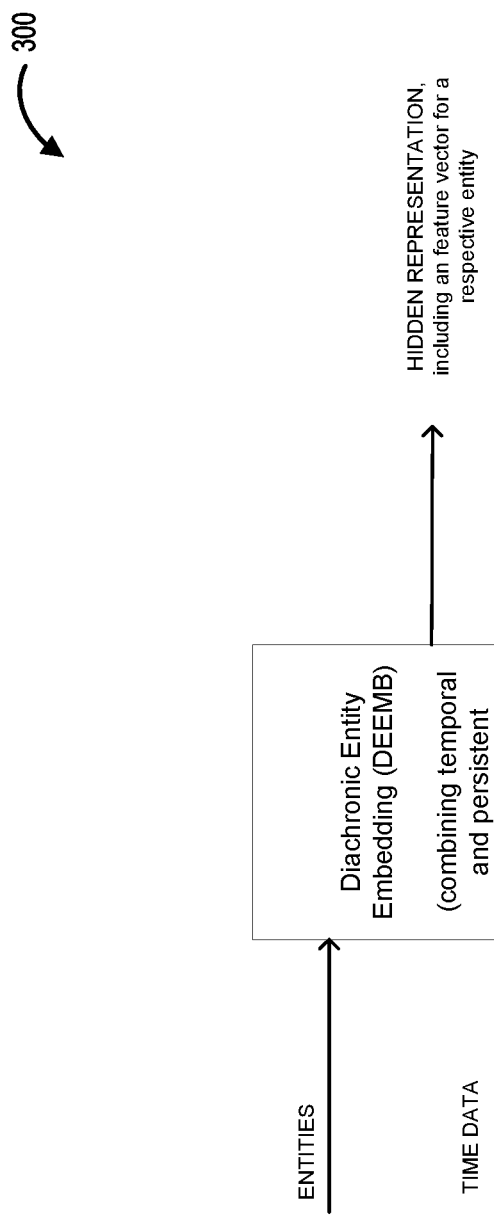
FIG. 3 illustrates a schematic representation of a diachronic entity embedding, in accordance with an embodiment of the present disclosure.

Reference is made to FIG. 3, which illustrates a schematic representation 300 of a diachronic entity embedding, in accordance with an embodiment of the present disclosure. The diachronic entity embedding may map respective pairs of at least one entity and time data to a hidden feature representation for the at least one entity at a specified time. In some embodiments, the diachronic embedding may be based on a combination of a first sub-function associated with a temporal feature and a second sub-function associated with a persistent feature.

Referring, as an example again, to a foregoing embodiment of diachronic entity embeddings, in one aspect $z_v^t \in \mathbb{R}^d$ may be a vector of DEEMB(v, t) (e.g., DEEMB(v, t)= $(\ldots, z_v^t, \ldots)$). Further, where $z_v^t$ may be defined as:

$$z_v^t[n] = \begin{cases} a_v[n]\sigma(w_v[n]t + b_v[n]), & \text{if } 1 \le n \le \gamma d. \\ a_v[n], & \text{if } \gamma d < n \le d. \end{cases} \quad (1)$$

in some embodiments, $z_{Mary}^t \in \mathbb{R}^4$ may be a vector representing features of Mary based on the diachronic entity embedding function of Equation (1). σ may be the sigmoid function $$\text{sigmoid}(x) = \frac{1}{1 + \exp(-x)}$$

and γ=0.5. Based on tuples representing facts in a knowledge graph, systems and methods may conduct operations to learn parameters associated with generating $z_{Mary}^t$. As an illustrating example, $z_{Mary}^t$ may be a hidden representation or vector with four elements:

1) 2.8σ(0.4t−802.8), 2) 0.2σ(−0.2t+399.0), 3) 0.6. 4) −0.2

The first temporal element may correspond to Mary's taste for animated movies. When t=1995, the value of the first temporal element may be approximately 0.02, illustrating that Mary may not be an animation movie fan in the year 1995. As time passes or advances, the value of the first temporal element may increase. For example, when t=2017, the value of the first temporal element may be approximately 2.7, indicating that Mary may have grown to become an animation movie fan. The first temporal element may help a learning model generate informed predictions about Mary's preferences at different points in time.

The coefficient 0.4 associated with the first temporal element may control the rate of change corresponding to Mary's change in preference (e.g., from not being an animation movie fan to being an animation movie fan). In some embodiments, the larger the coefficient associated with the parameter t, the greater the rate of change associated with the feature represented by the first temporal element.

Further, the value of 802.8 may be associated with a turning point or inflection point associated with when Mary's taste for animation movies may change from not being an animation movie fan to being an animation movie fan. The coefficient of 2.8 may be associated with the importance of the feature represented by the first temporal vector value (e.g., the importance of taste for animation movies) as compared to the importance of other features associated with Mary.

The second temporal element, third temporal element, and fourth temporal element of the vector $z_{Mary}^t$ may represent other features of Mary. By considering one or more features based on a hidden representation with time-varying representations, systems and methods may conduct operations to predict or infer facts about Mary at any time on a time spectrum. It may be understood that the explanation of the first temporal element is provided merely to illustrate features of the embedding function represented by Equation (1) and that in practice the elements of the vector may not have a statically defined feature meaning.

Training/learning model parameters: In some embodiments, the system 100 may conduct operations for learning parameters associated with diachronic embeddings based on facts associated with a knowledge graph $\mathcal{G}$. The facts may be divided into one or more training data sets, validation data sets, and test data sets. In some embodiments, model parameters associated with diachronic embeddings may be learned based on stochastic gradient descent with minibatches. To illustrate, B⊂train may be a mini-batch. For respective facts f=(v, r, u, t)∈B, the system 100 may conduct operations to generate two queries: (1) (v, r, ?, t) and (2) (?, r, u, t).

For the first query, the system 100 may generate a candidate answer set $C_{f,v}$ containing v and n other entities (hereafter referred to as negative ratio) selected randomly from V. For the second query, the system 100 may generate a similar candidate answer set $C_{f,u}$. The system 100 may conduct operations to minimize a cross entropy loss, providing results for both static and temporal KG completion (see, e.g., [23, 17]):

$$\mathcal{L} = -\left(\sum_{f=(v,r,u,t)\in B} \frac{\exp(\phi(v, r, u, t))}{\sum_{u'\in C_{f,u}}\exp(\phi(v, r, u, t))} + \frac{\exp(\phi(v, r, u, t))}{\sum_{v'\in C_{f,v}}\exp(\phi(v, r, u, t))}\right) \quad (2)$$

To illustrate operations for identifying model parameters associated with a diachronic embedding, consider a temporal knowledge graph where (Mary, Married, Bob, 01-01-2002) may be a temporal tuple. The training system may create two queries for this temporal tuple: (1) (Mary, Married, ?, 01-01-2002) and (2) (?, Married, Bob, 01-01-2002). Presuming that a negative ratio (n) may be 2, for the first query, the learning system may create an answer set containing Bob and two other random entities from the knowledge graph. Let the two other randomly selected entities be Alice and GF. The learning system may generate the following three scores:

$s_1 = \phi$(Mary, Married, Bob, 01-01-2002)

$s_2 = \phi$(Mary, Married, Alice, 01-01-2002)

$s_3 = \phi$(Mary, Married, GF, 01-01-2002)

By minimizing $$-\frac{\exp(s_1)}{\exp(s_1) + \exp(s_2) + \exp(s_3)}$$

in the loss function (see e.g., Equation (2)), the learning system may update parameters such that the score associated with $s_1$ increases and the scores associated $s_2$ and $s_3$ decrease. The learning system may update model parameters such that (Mary, Married, Bob, 01-01-2002) becomes more likely and (Mary, Married, Alice, 01-01-2002) and (Mary, Married, GF, 01-01-2002) become less likely. In the above example, the first query corresponding to the first fraction in the loss function of Equation (2) is described, and a similar analysis may be conducted for the second fractional component in Equation (2).

In some embodiments, variations of diachronic embedding functions for providing a tuple of vectors may be contemplated. Variations of the example diachronic embedding function associated with Equation 1 may include: variations of activation functions, such as the sigmoid function, the Tanh function, Leaky ReLU, or squared exponential function. Other variations of the may include removing the control parameter $a_v$s from the temporal portion of Equation (1). In some other variations, entity-specific vectors, such as $w_v$s and/or $b_v$s, may be removed from the temporal portion of Equation (1).

Features of the diachronic embedding function associated with Equation (1) may be used for defining vectors associated with entities (e.g., nodes of a knowledge graph) or defining vectors associated with relations (e.g., edges of a knowledge graph). Thus, the system 100 may map entity/time (e.g., (v, t) pairs) to hidden representations and may also may map relation/time (e.g., (r, t) pairs) to hidden representations.

In some situations, knowledge graph relations may evolve at a lower rate or may evolve only negligibly over time, whereby modelling evolutions of relations over time based on diachronic embeddings described herein may not be helpful. Thus, simply modelling evolutions of relations over time based on static embeddings may be sufficient in some situations. In these situations, embodiment systems and methods may include operations to model relations (e.g., knowledge graph edges) based only on static embeddings.

Figure 4:
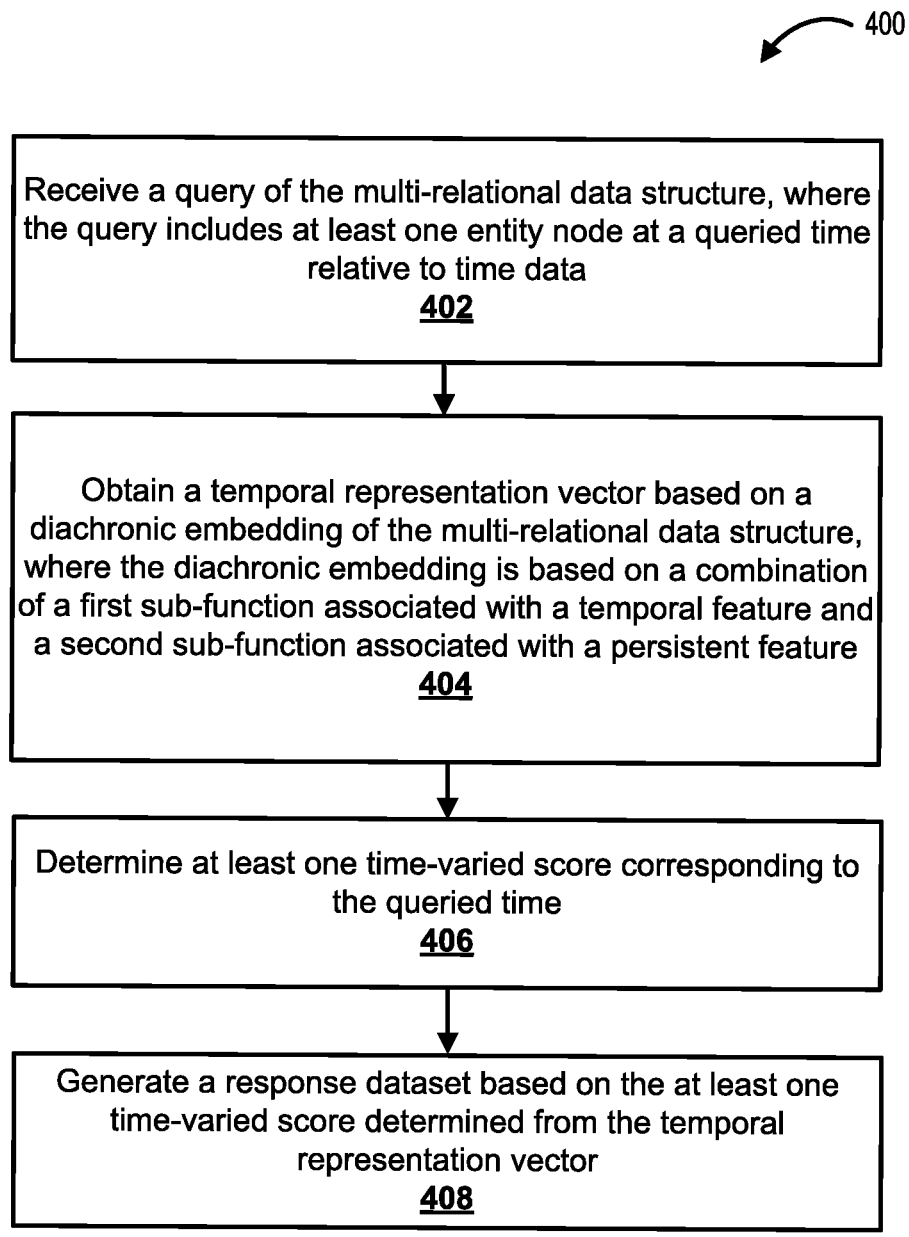
FIG. 4 illustrates a flowchart of a method of querying a multi-relational data structure, in accordance with an embodiment of the present disclosure.

Reference is made to FIG. 4, which illustrates a flowchart of a method 400 of expanding or managing a multi-relational data structure tunable for generating a non-linear dataset from a time-dependent query, in accordance with embodiments of the present disclosure. In some embodiments, the method 400 may include managing the multi-relational data structure, such as updating the multi-relational data structure based on inferred or predicted data records associated with time-dependent queries.

The method 400 may be conducted by the processor 102 of the system 100 (FIG. 1). Processor-readable instructions may be stored in the memory 106 and may be associated with the multi-relational data application 112 or other processor readable applications not illustrated in FIG. 1. The method 400 may include operations, such as data retrievals, data manipulations, data storage, or the like, and may include other computer executable functions.

In some embodiments, the multi-relational data structure may be a knowledge graph, including a directed knowledge graph. In some embodiments, the multi-relational data structure may represent real world entities as nodes and relations among the nodes. In some other embodiments, the multi-relational data structure may represent non-real world entities, such as relations between two or more words in a portion of text, discrete multimedia clips within a multimedia file, or the like.

At operation 402, the processor may receive a query of the multi-relational data structure. The multi-relational data structure may represent at least one tuple including entity nodes, a relation among the entity nodes, and time data associated with at least one entity node. The query may include a queried feature of the at least one entity node at a queried time relative to the time data. As an illustrating example, the received query may be "Does Mary like romance-themed movies in 2003?" or "Did John marry Jane in 2008?".

In some embodiments, the query may be associated with a generated response dataset for a queried feature of at least one entity node at the queried time, such that the processor may construct or update a knowledge graph based on the response data set.

In some embodiments, the query may be received from a user who would like to interpolate one or more facts based on an existing knowledge graph. When the query is directed to interpolating one or more facts, the queried time may temporally be within the boundaries of time data associated with tuples used to generate the knowledge graph. For instance, if the knowledge graph is based on tuples of facts between the year 1995 and 2000, the queried time (e.g., 1998) may be between the year 1995 and 2000. In situations where a received query corresponds to interpolating a fact based on an existing knowledge graph, a score based on a diachronic embedding may be computed based on hidden representations of features associated with past time data, present time data, and/or future time data.

In some embodiments, the query may be received from a user who may wish to extrapolate one or more facts based on the existing knowledge graph. For example, extrapolation may correspond to a query where future time interactions may be predicted (see, e.g., [56, 33, 57]). In situations related to extrapolation, the time query may be outside the boundaries of time data associated with tuples used to generate the knowledge graph. That is, with a query to extrapolate facts, the processor may generate a temporal tuple extraction based on a diachronic embedding score for a temporal tuple (e.g., for (v, r, u, t)) based only on past facts before time data (t). To be suitable for extrapolating facts from the existing knowledge graph, in some embodiments, the system 100 may have previously conducted training operations to identify learned parameters of diachronic embeddings suitable for generating temporal representation vectors for tuple extrapolation.

At operation 404, the processor may obtain a temporal representation vector based on a diachronic embedding of the multi-relational data structure. The diachronic embedding may be based on a combination of a first sub-function associated with a temporal feature and a second sub-function associated with a persistent feature. The diachronic embedding may map respective pairs of entity data and time data to a hidden representation, where the hidden representation may be a class of non-empty types of victors and/or matrices.

In some embodiments, the processor may retrieve entity data and associated time data as input to a diachronic embedding and, based on the diachronic embedding, the processor may generate output that includes a tuple of vectors. $z_v^t \in \mathbb{R}^d$ may be a vector of DEEMB(v, t). For example, DEEMB(v, t) ( . . . , $z_v^t$, . . . ). In some embodiments, $z_v^t$ may be defined as:

$$z_v^t[n] = \begin{cases} a_v[n]\sigma(w_v[n]t + b_v[n]), & \text{if } 1 \leq n \leq \gamma d. \\ a_v[n], & \text{if } \gamma d < n \leq d. \end{cases}$$

where $a_v \in \mathbb{R}^d$ and $w_v, b_v \in \mathbb{R}^{\Gamma d}$ are (entity-specific) vectors with learnable parameters and a may be an activation function, as described earlier in the present disclosure. Although the above example provides vectors associated with entities (e.g., v), the diachronic embedding may also provide vectors associated with relations (e.g., r). The respective vectors may correspond to features of entities or relations of the knowledge graph.

Referring again to an earlier described example, the obtained temporal representation vector may be a hidden representation such as $z_{Mary}^t$ having at least four elements: 1) 2.8σ(0.4t−802.8), 2) 0.2σ(−0.2t+399.0), 3) 0.6, 4) −0.2.

In some embodiments, the diachronic embedding may be based on a learnable parameter controlling proportions of temporal features to persistent features for providing or generating the temporal representation vector.

In the above example diachronic embedding, the learnable parameter may be a hyper-parameter γ, where the hyper-parameter may apportion the number of elements associated with temporal features and the number of elements associated with persistent features. In some examples, the learned hyper-parameter may be desirable for reducing overfitting of elements associated with temporal features. Further, while persistent features can in some situations be obtained by setting some of the coefficients of the diachronic embedding to a value of zero, it may be desirable to explicitly model persistent features for reducing the number of learnable parameters. In some aspects, the hyper-parameter may be tuned during some example machine learning operations described in the present disclosure.

In some embodiments, the generated or obtained temporal representation vector may be based on an entity embedding associated with both temporal features and persistent features and a relation embedding associated with persistent features to the exclusion of temporal features. As relations represented in multi-relational data structures may evolve at a lower rate or may evolve negligibly over time, in some examples it may be desirable to reduce training operations associated with diachronic relation embeddings. Thus, in some embodiments, the temporal representation vector(s) may be based on a diachronic entity embedding (exemplified in the present disclosure) and static relation embeddings.

In some embodiments, the processor may receive a plurality of temporal tuples for learning diachronic embedding parameters. For example, the plurality of temporal tuples may be facts represented in a knowledge graph, and the parameters of the diachronic embedding may be learned using stochastic gradient descent with mini-baches and operations for minimizing a loss function. In the foregoing diachronic embedding example, the model parameters may be associated with at least one of $a_v$, $w_v$, or $b_v$, which may be useful for varying entity feature prominence as a function of time. Once the processor conducts operations to determine one or more model parameters of the diachronic embedding, the processor may update the diachronic embedding based on the learned parameters. In some aspects, the model parameters of the diachronic embedding may be tuned or varied based on example learning operations, such as training and validating, described in the present disclosure.

In embodiments of the present disclosure, once model parameters of the diachronic embedding are determined or are updated, the example system 100 (FIG. 1) may be configured for predicting or inferring facts associated with any queried time along a time spectrum.

In some embodiments, the processor may conduct learning operations for varying the activation function based on query types or for tuning or removing coefficients of the diachronic embedding based on query types (e.g., removing one or more of $a_v$, $w_v$, or $b_v$ from the diachronic embedding function. For example, the processor may conduct learning operations associated with the diachronic embedding function based on at least two or more activation functions (e.g., sigmoid function, sine function, or others) and may determine a desirable activation function for use with a subset group of queries.

For example, the processor may conduct operations to identify that a sigmoid activation function may provide desirable temporal knowledge graph completion results for a first subset grouping of entities identified in queries. Further, the processor may identify that a sine activation function may provide desirable temporal knowledge graph completion results for a second subset grouping of entities identified in queries. Accordingly, the processor may update the diachronic embedding to utilize the sigmoid function when a query is associated with an entity of the first subset grouping and to utilize the sine function when a query is associated with an entity of the second subset grouping, thereby providing for pseudo-dynamic activation function implementation for the diachronic embedding.

At operation 406, the processor may determine, from the temporal representation vector, at least one time-varied score corresponding to the queried time. For example, the processor may identify the queried time from the query (e.g., from operation 402), and may generate at least one time-varied score based on the temporal representation vector and the queried time. For instance, when t=2017, the processor may determine that the first temporal element in the temporal representation vector may be approximately 2.7 (e.g., a time-varied score).

At operation 408, the processor may generate a response dataset based on the at least one time-varied score determined from the temporal representation vector. For example, when the query received at operation 402 is "Does Mary like animation movies today (year 2017)?", the processor (at operation 406) may determine that the first temporal element of an output vector of the diachronic embedding provides a value of 2.7 for the year 2017 and that the first temporal element of the output vector of the diachronic embedding provides a value of 0.02 for the year 1995. Based on relative comparisons of time-varied scores, the processor, at operation 408, may generate a response specifying that Mary likely prefers animation movies today. The foregoing example generates responses based on comparing time-varied scores calculated from temporal representation vectors. In some other embodiments, the processor may generate responses based on other operations, such as absolute score mappings with a look up table, etc. It may be understood that the generated response dataset may be described as being non-linear at least because Mary's sentiment for a particular movie genre (as an example) may not be static over time. Further, Mary's sentiment for a particular movie genre may also not decline or increase steadily over time. In embodiments of the present disclosure, the temporal representation vector may be based on or may represent the non-linear, irregular, or non-patterned time-varying features of entities or relations that may be used for generating response datasets.

In some embodiments, the processor may update the multi-relational data structure based on the response to the query. For instance, the processor may generate a temporal tuple (Mary, Liked, AnimationMovies, 2017) (determined at operation 408) and update the set of temporal tuples associated with the multi-relational data structure.

In another illustrating example, a banking institution system may generate a temporal knowledge graph representing relationships among companies from textual news. The temporal knowledge graph may be configured to represent facts such as: company A acquired company B at time t1, company B sued company C at time t2, etc. Such fact representations may be useful to a research analyst who may want to prepare a report to assist an investor deciding whether investment in a particular company may be a reasonable investment or to assist an investor who may be assessing a company's cash flow.

As fact extraction from news articles or from Internet sources may be inaccurate or noisy, before updating the knowledge graph with the extracted facts, operations may be conducted to measure the plausibility of the fact extraction based on the plausibility score meeting a feature threshold. In the present example, the processor may determine, based on facts represented in a knowledge graph, that company B and company C may be commonly owned companies. Although the information "company B sued company C" may be published by Internet sources, in the present example, the processor may conduct operations to determine that it may be unlikely that company B would initiate a law suit with company C and, accordingly, may assign a plausibility score (e.g., score value of 0.2) below a feature threshold (e.g., threshold value of 5). By identifying fact tuples that may not represent plausible facts, the systems and methods described herein may reduce chances of updating multi-relational data structures with inaccurate facts. In the present example, the processor may discard the fact tuple associated with the plausibility score failing to meet the feature threshold. In some embodiments, the system may conduct operations to update model parameters to reduce likelihood of fact tuples having similar low plausibility from being generated based on future queries.

In some situations, a knowledge graph that generates non-calibrated feature scores may inadvertently reject some correct fact extractions (false negative result) or may cause wrong extractions to be added to the knowledge graph (e.g., false positive result). Accordingly, embodiments of systems and methods utilizing diachronic embeddings based at least on a combination of temporal features and persistent features may increase the accuracy of fact extractions. As the diachronic embedding is based on a hidden representation corresponding to a combination of temporal features and persistent features, the diachronic embedding may provide output that more accurately represents temporal inferences of facts as compared to temporal inferences of facts associated with static embeddings.

In situations where the processor may determine that a plausibility score for a predicted tuple may not meet the feature threshold, the processor may update the model parameters (e.g., entity-specific model parameters or relation-specific model parameters) for reducing occurrence of generating future tuple extractions corresponding to the temporal tuple extraction that was associated with a features score not meeting the feature threshold.

Based on some embodiments in the present disclosure, systems and methods may conduct operations of temporal versions of knowledge graph embeddings, including temporal versions of TransE, DistMult, SimplE, Tucker, RESCAL, or other models by replacing static entity embeddings with embodiments of diachronic embeddings. That is, in some embodiments, diachronic embeddings may be model-agnostic. When such static knowledge graph embeddings may be extended to temporal versions of knowledge graph embeddings, the resulting embeddings may be described as DE-TransE, DE-DistMult, DE-SimplE, etc. That is, DE may be an acronym for Diachronic Embedding.

It may be noted that in some situations, transforming a static knowledge graph embedding into a temporal version of the knowledge graph embeddings may not be trivial. For example, it may not be trivial to extend the knowledge graph embedding known as RESCAL to a temporal knowledge graph embedding based on a proposal in reference [17] (except for the nave approach of expecting an LSTM to output large $Z_r$ matrices), and additional operations for the implementation may be required. The foregoing may be similarly expected for other embedding models, where the relation embeddings may contain matrices (see e.g., references [43], [53], or [39]).

In some examples, it may be desirable to conduct operations based on embedding functions having full expressivity. For example, expressivity has been a subject of study for static knowledge graphs (see e.g., references [6, 59, 26, 63, 2]. If an embedding function is not fully expressive or not expressive enough, operations associated with embedding functions that are not fully expressive may result in under-fitting.

Embodiments of the present disclosure may be based on diachronic embedding functions that may be fully expressive. As will be shown, diachronic embedding functions may be associated with parameters θ that, if given any world with true tuples $\mathcal{W}$ and false tuples $\mathcal{W}^c$, there exists an assignment for θ that correctly classifies the tuples in $\mathcal{W}$ and $\mathcal{W}^c$ (e.g., full expressivity). A embodiment of a proof that DE-SimplE may be fully expressive for temporal knowledge graph completion follows.

For every entity $v_i \in \mathcal{V}$, let DEEM $(v_i, t) = (z_{v_i}^t, \hat{z}_{v_i}^t)$ where, according to Equation (1) with sine activations, $z_{v_i}^t \in \mathbb{R}^d$ and $\hat{z}_{v_i}^t \in \mathbb{R}^d$, may be defined as follows:

$$z_{v_i}^t[n] = \begin{cases} a_{v_i}[n] \sin(w_{v_i}[n]t + b_{v_i}[n]), & \text{if } n \leq \gamma. \\ a_{v_i}[n], & \text{if } n > \gamma. \end{cases}$$

and $$\hat{z}_{v_i}^t[n] = \begin{cases} \hat{a}_{v_i}[n] \sin(\hat{w}_{v_i}[n]t + \hat{b}_{v_i}[n]), & \text{if } n \leq \gamma. \\ \hat{a}_{v_i}[n], & \text{if } n > \gamma. \end{cases}$$

The following proof is for a specific case of DE-SimplE where the elements of $z_v^t$'s are all temporal and the elements of $\hat{z}_v^t$'s are all non-temporal. This specific case may be achieved by setting $\gamma = d$, and $$\hat{w}_v[n] = 0 \text{ and } \hat{b}_v[n] = \frac{\pi}{2}$$

for all $v \in \mathcal{V}$ and for all $1 \leq n \leq d$. If this specific case of DE-SimplE is fully expressive, DE-SimplE is fully expressive.

In the above described specific case, and $z_{v_i}^t$ and $\hat{z}_{v_i}^t$ for every $v_i \in \mathcal{V}$ can be re-written as follows:

$$z_{v_i}^t[n] = a_{v_i}[n] \sin(w_{v_i}[n]t + b_{v_i}[n])$$

$$\hat{z}_{v_i}^t[n] = \hat{a}_{v_i}[n]$$

For every relation $r_j \in \mathcal{R}$, let REMB$(r) = (z_{r_j}, \hat{z}_{r_j})$. To further simplify the proof, following [26], the present disclosure illustrates how the embedding values may be set such that $\langle z_{v_i}^t, z_{r_j}, z_{v_k}^t \rangle$ becomes a positive number if $(v_i, r_j, v_k, t) \in \mathcal{W}$ and a negative number if $(v_i, r_j, v_k, t) \in \mathcal{W}^c$. Extending the proof to the case where the score contains both components $(\langle z_{v_i}^t, z_{r_j}, \hat{z}_{v_k}^t \rangle$ and $\langle z_{v_i}^t, \hat{z}_{r_j}, \hat{z}_{v_k}^t \rangle)$ can be done by doubling the size of the embedding vectors and following a similar procedure as the one explained below for the second half of the vectors.

Assume $d = |\mathcal{R}| \cdot |\mathcal{V}| \sim |\mathcal{T}| \cdot L$ where L is a natural number. These vectors can be viewed as $|\mathcal{R}|$ blocks of size $|\mathcal{V}| \cdot |\mathcal{T}| \cdot L$. For the $j^{th}$ relation $r_j$, let $z_{r_j}$ be zero everywhere except on the $j^{th}$ block where it is 1 everywhere. With such a value assignment to $z_{r_j}$s, to find the score for a fact $(v_i, r_j, v_k, t)$ only the $j^{th}$ block of each embedding vector may be important.

Focusing on the $j^{th}$ block, the size of the $j^{th}$ block (similar to all other blocks) is $|\mathcal{V}| \sim |\mathcal{T}| \cdot L$ and it can be viewed as $|\mathcal{V}|$ sub-blocks of size $|\mathcal{T}| \cdot L$. For the $i^{th}$ entity $v_i$, let the values of $a_{v_i}$ be zero in all sub-blocks except the $i^{th}$ sub-block. With such a value assignment, to find the score for a fact $(v_i, r_j, v_k, t)$, only the $i^{th}$ sub-block of the $j^{th}$ block is important. Note that this sub-block is unique for each tuple $(v_i, r_j)$.

Focusing on the $i^{th}$ sub-block of the $j^{th}$ block, the size of the $i^{th}$ sub-block of the $j^{th}$ block is $|\mathcal{T}| \cdot L$ and it can be viewed as $|\mathcal{T}|$ sub-sub-blocks of size L. According to the Fourier sine series [7], with a large enough L, the present disclosure can set the values for $a_{v_i}$, $w_{v_i}$, and $b_{v_i}$ in a way that the sum of the elements of $z_{v_i}^t$, for the $p^{th}$ sub-sub-block becomes 1 when $t = t_p$ (where $t_p$ is the $p^{th}$ timestamp in $\mathcal{T}$) and 0 when t is a timestamp other than $t_p$. Note that this sub-sub-block is unique for each tuple $(v_i, r_j, t_p)$.

Having the above value assignments, if $(v_i, r_j, v_k, t_p) \in \mathcal{W}$, the present proof may set all the values in the $p^{th}$ sub-block of the sub-block of the $j^{th}$ block of $\hat{a}_{v_k}$ to 1. With this assignment, $\langle z_{v_i}^t, z_{r_j}, \hat{z}_{v_k}^t \rangle = 1$ at $t = t_p$. If $(v_i, r_j, v_k, t_p) \in \mathcal{W}^c$, the present proof may set all the values for the $p^{th}$ sub-sub-block of the $i^{th}$ sub-block of the $j^{th}$ block of $a_{v_k}$ to −1. With this assignment, $\langle z_{v_i}^t, z_{r_j}, \hat{z}_{v_k}^t \rangle = -1$ at $t = t_p$.

In some examples of static knowledge graph embedding models, certain types of domain knowledge (if exists) may be incorporated into the embeddings through parameter sharing (e.g., tying). Experiments have demonstrated that domain knowledge may improve model performance (see e.g., references [26, 55, 42, 16]). In some embodiments, domain knowledge may also be extended to diachronic embedding functions for temporal knowledge graph completion. For example, the following disclosure demonstrates that domain knowledge may be incorporated into SimplE-based functions.

Consider $r_i \in \mathcal{R}$ with REMB$(r_i) = (z_{r_i}, \hat{z}_{r_i})$ (according to SimplE). If $r_i$ is known to be symmetric or anti-symmetric, the knowledge can be incorporated into the embeddings by tying $z_{r_i}$ to $\hat{z}_{r_i}$ or negation of $z_{r_i}$ respectively [26]. If $r_i$ is known to be the inverse of $r_j$, the knowledge can be incorporated into the embeddings by tying $z_{r_i}$ to $\hat{z}_{r_j}$ and $z_{r_j}$ to $\hat{z}_{r_i}$ [26].

As a proposition (e.g., proposition 1), symmetry, antisymmetry, and inversion can be incorporated into DE-SimplE in the same way as SimplE. An embodiment of a proof is as follows.

Let $r_i \in \mathcal{R}$ with $REMB(r_i)=(z_{r_i}, \hat{z}_{r_i})$ be symmetric. According to DE-SimplE, for a fact $(v, r_i, u, t)$:

$$\phi(v, r_i, u, t) = \frac{(<z_v^t, z_{r_i}, \hat{z}_u^t> + <z_u^t, \hat{z}_{r_i}, \hat{z}_v^t>)}{2} \quad (7)$$

where $\phi(.)$ gives the DE-SimplE score for a fact, $z_v^t$ and $\hat{z}_v^t$ are two vectors assigned to $v$ (according to SimplE) both defined according to Equation (1), and $z_u^t$ and $\hat{z}u^t$ are two vectors assigned to U both defined according to Equation (1).

Moreover, for a fact $(u, r_i, v, t)$:

$$\phi(u, r_i, v, t) = \frac{(<|z_u^t|, |z_{r_i}|, \hat{z}_v^t> + <z_v^t, \hat{z}_{r_i}, \hat{z}_u^t>)}{2} \quad (8)$$

By tying $z_{r_i}$ to $\hat{z}_{r_i}$, the two scores become identical. Therefore, tying $z_{r_i}$ to $\hat{z}_{r_i}$ may ensure that the score for $(v, r_i, u, t)$ is the same as the score for $(u, r_i, v, t)$ thus ensuring the symmetry of $r_i$. With the same argument, if $z_{r_i}$ is tied to $\hat{z}_{r_i}$ then one score becomes the negation of the other score so only one of them can be true.

Assume $r_j$ with $REMB(r_j)=(z_{r_j}, \hat{z}_{r_j})$ is known to be the inverse of $r_i$. Then the score for a fact $(v, r_i, u, t)$ is as in Equation (7) and for $(u, r_j, v, t)$ is as follows:

$$\phi(u, r_j, v, t) = \frac{(<z_u^t, z_{r_j}, \hat{z}_v^t> + <z_v^t, \hat{z}_{r_j}, \hat{z}_u^t>)}{2} \quad (9)$$

By tying $z_{r_j}$ to $\hat{z}r_i$ and $\hat{z}_{r_j}$ to $z_{r_i}$, the score in Equation (9) can be re-written as:

$$\phi(u, r_j, v, t) = \frac{(<z_u^t, \hat{z}_{r_i}, \hat{z}_v^t> + <z_v^t, z_{r_i}, \hat{z}_u^t>)}{2} \quad (10)$$

This score is identical to the score in Equation (7). Therefore, tying $z_{r_j}$ to $\hat{z}_{r_i}$ and $\hat{z}_{r_j}$ to $z_{r_i}$, ensures $r_i$ and $r_j$ are the inverse of each other.

Accordingly, if $r_i$ is known to entail $r_j$, Fatemi et al. [16] prove that if entity embeddings are constrained to be non-negative, then this knowledge can be incorporated by tying $z_{r_j}$ to $z_{r_i}+\delta_{r_j}$ and $\hat{z}_{r_j}$ to $\hat{z}_{r_i}+\hat{\delta}_{r_j}$ where $\delta_{r_j}$ and $\hat{\delta}_{r_j}$ are vectors with non-negative elements. A similar approach may be provided for DE-SimplE, described herein.

Further as a proposition (e.g., proposition 2), by constraining $a_v$s in Equation (1) to be non-negative for all $v \in \mathcal{V}$ and $\sigma$ to be an activation with a non-negative range (e.g., such as ReLU, sigmoid, or squared exponential), entailment may be incorporated into DE-SimplE in the same way as SimplE. An embodiment of a proff is as follows.

Let $r_i \in \mathcal{R}$ with $REMB(r_i)=(z_{r_i}, \hat{z}_{r_i})$ and $r_j \in \mathcal{R}$, with $REMB(r_j)=(z_{r_j}, \hat{z}_{r_j})$ be two distinct relations such that $r_i$ entails $r_j$. For a fact $(v, r_i, u, t)$, the score according to DE-SimplE is as in Equation (7), and for $(v, r_j, u, t)$, the score is as follows:

$$\phi(v, r_j, u, t) = \frac{(<z_v^t, z_{r_j}, \hat{z}_u^t> + <z_u^t, \hat{z}_{r_j}, \hat{z}_v^t>)}{2} \quad (11)$$

By tying $z_{r_j}$ to $z_{r_i}+\delta_{r_j}$ and $\hat{z}_{r_j}$ to $\hat{z}_{r_i}+\hat{\delta}_{r_j}$, where $\delta_{r_j}$ and $\hat{\delta}r_j$ are vectors with non-negative elements (thus, making this tying scheme equivalent to two inequality constraints), the score in Equation (11) can be re-written as:

$$\phi(v, r_j, u, t) = \frac{(<z_v^t, z_{r_i} + \delta_{r_j}, \hat{z}_u^t> + <z_u^t, \hat{z}_{r_i} + \delta_{r_j}, \hat{z}_v^t>)}{2} \quad (12)$$

$$= \frac{<z_v^t, z_{r_i}, \hat{z}_u^t> + <z_v^t, \delta_{r_j}, \hat{z}_u^t> +}{} \quad (13)$$

$$\frac{<z_u^t, \hat{z}_{r_i}, \hat{z}_v^t> + <z_u^t, \hat{\delta}_{r_j}, \hat{z}_v^t>}{2}$$

$$= \phi(v, r_i, u, t) + \frac{<z_v^t, \delta_{r_j}, \hat{z}_u^t> + <z_u^t, \hat{\delta}_{r_j}, \hat{z}_v^t>}{2} \quad (14)$$

The constraints imposed on the elements of $z_v^t, \hat{z}_v^t, z_u^t$, and $\hat{z}_u^t$ ensure that all elements of these vectors are non-negative. Furthermore, $\delta_{r_j}$ and $\hat{\delta}_{r_j}$ have also been constrained to be non-negative. Therefore, $<z_v^t, \delta_{r_j}, \hat{z}_u^t>$ and $<z_u^t, \hat{\delta}_{r_j}, \hat{z}_v^t>$ are both non-negative resulting in:

$$\phi(v, r_j, u, t) = \quad (15)$$

$$\phi(v, r_i, u, t) + \frac{<z_v^t, \delta_{r_j}, \hat{z}_u^t> + <z_u^t, \hat{\delta}_{r_j}, \hat{z}_v^t>}{2} \geq \phi(v, r_i, u, t)$$

Since $\phi(v, r_j, u, t) \geq \phi(v, r_i, u, t)$, the probability of $(v, r_j, u, t)$ being true according to DE-SimplE is greater than or equal to the probability of $(v, r_i, u, t)$ being true thus ensuring the entailment of the relations.

Compared to the result in Fatemi et al. [16], the added constraint for DE-SimplE includes the activation function in Equation (1) being constrained to have a non-negative range (disclosed in the foregoing proofs). Similar proofs may be possible for different examples of diachronic entity embedding functions.

Various experiments have been conducted to test systems and methods described in the present disclosure. Datasets used for experiments included subsets of two temporal knowledge graphs that have become standard benchmarks for temporal knowledge graph completion: ICEWS [5] and GDELT [38]. For ICEWS, experiments utilized the two subsets generated by [17]: one corresponding to the facts in 2014 (hereafter named ICEWS14) and the other corresponding to the facts between 2005 to 2015 (hereafter named ICEWS05-15). For GDELT, experiments utilized the subset extracted by [56] corresponding to the facts from Apr. 1, 2015 to Mar. 31, 2016. Experiments included modified datasets by changing the train/validation/test sets based on a similar procedure disclosed in the reference [4] for a temporal knowledge graph completion problem (e.g., an interpolation query), rather than an extrapolation query. Table 1 provides a summary of the dataset statistics.

TABLE 1

Statistics on ICEWS14, ICEWS05-15, and GDELT.

| Dataset | $|\mathcal{V}|$ | $|\mathcal{R}|$ | $|\mathcal{T}|$ | |train| | |validation| | |test| | $|\mathcal{G}|$ |
|---|---|---|---|---|---|---|---|
| ICEWS14 | 7,128 | 230 | 365 | 72,826 | 8,941 | 8,963 | 90,730 |
| ICEWS05-15 | 10,488 | 251 | 4017 | 386,962 | 46,275 | 46,092 | 479,329 |
| GDELT | 500 | 20 | 366 | 2,735,685 | 341,961 | 341,961 | 3,419,607 |

In the experiments, baselines included both static and temporal knowledge graph embedding models. From the static KG embedding models, experiments use TransE and DistMult and SimplE where the timing information may be ignored.

For metrics, for each fact f=(v, r, u, t) E test, experiments included two queries: (1) (v, r, ?, t) and (2) (?, r, u, t). For the first query, the model ranks all entities in u $\cup \overline{C}_{f,u}$ where $\overline{C}_{f,u}$={u': u' $\in \mathcal{V}$, (v, r, u', t)$\notin \mathcal{G}$ }. This corresponds to the filtered setting commonly used in the literature [4]. Experiments may conduct a similar approach for the second query. Let $k_{f,u}$ and $k_{f,v}$ represent the ranking for u and v for the two queries respectively. A mean reciprocal rank (MRR) may be defined as $$\frac{1}{2*|test|} \sum_{f=(v,r,u,t) \in test} \left( \frac{1}{k_{f,u}} + \frac{1}{k_{f,v}} \right).$$

Compared to a mean rank, which is largely influenced by a single bad prediction, MRR may be more stable [45]. Experiment results also report Hit@1, Hit@3 and Hit@10 measures where Hit@k is defined as $$\frac{1}{2*|test|} \sum_{f=(v,r,u,t) \in test} \left( 1_{k_{f,u} \leq k} + 1_{k_{f,v} \leq k} \right),$$

where $1_{cond}$ is 1 if cond holds and 0 otherwise.

Experiments in the present examples implemented embodiments of the diachronic embedding models disclosed herein and the baselines in PyTorch [49]. Experiments were conducted on a node with four GPUs. To keep the number of experiments manageable, for the two ICEWS datasets, results of experiments were reported for some of the baselines from [17]. For other experiments on the datasets, for the fairness of results, experiments follow a similar experimental setup as in [17] by using the ADAM optimizer [30] and setting learning rate=0.001, batch size=512, negative ratio=500, embedding size=100, and validating every 20 epochs selecting the model giving the best validation MRR. Following the best results obtained in [41] for ConT (and considering the memory restrictions), for ConT experiments were conducted with setting embedding size=40, batch size=32 on ICEWS14 and GDELT and =16 on ICEWS05-15. Experiments validated dropout values from {0.0,0.2, 0.4}. Experiments tuned γ for our model from the values {16,32,64}. For GDELT, experiments used a similar setting but with a negative ratio=5 due to the large size of the dataset.

Experiments were conducted using the sine function as the activation function for Equation (1). Since the timestamps in the datasets are dates rather than single numbers, experiments applied the temporal part of Equation (1) to year, month, and day separately (with different parameters) thus obtaining three temporal vectors. An element-wise sum of the resulting vectors was taken to obtain a single temporal vector.

Comparative Study: Experiments included three variants of the diachronic embedding model: 1—DE-TransE, 2—DE-DistMult, and 3—DE-SimplE. Table 2 illustrates obtained results on benchmarks for the three variants and for the baselines. In particular, Table 2 provides comparative analysis of knowledge graph completion performance when diachronic embeddings described in the present disclosure are integrated with embedding operations and when diachronic embeddings may not be integrated with embedding operations. As illustrated in the comparative analysis associated with Table 2, when diachronic embeddings are integrated with embedding operations, there may be technical improvements to systems for managing multi-relational data structures tunable for generating datasets from time-dependent queries. In some aspects, the comparative testing results may be directed to mean reciprocal rank, which may be a statistical measure for evaluating operations for generating a list of possible responses to a sample of queries.

From the obtained results, the large number of parameters for each timestamp appears to show that ConT performs poorly on ICEWS14 and ICEWS05-15. On GDELT, the obtained results shows a somewhat better performance as it has many training facts but not many timestamps. Besides affecting the predictive performance, the large number of parameters per timestamp makes training ConT extremely slow (it took more than one month to train ConT on ICEWS05-15). From the results, in most cases, the temporal versions of different models outperform the static counterparts thus providing evidence for the merit of capturing temporal information.

TABLE 2

Results on ICEWS14, ICEWS05-15, and GDELT. Best results are in bold.

| | ICEWS14 | | | | ICEWS05-15 | | | | GDELT | | | |
|---|---|---|---|---|---|---|---|---|---|---|---|---|
| Model | MRR | Hit@1 | Hit@3 | Hit@10 | MRR | Hit@1 | Hit@3 | Hit@10 | MRR | Hit@1 | Hit@3 | Hit@10 |
| TransE | 0.280 | 9.4 | — | 63.7 | 0.294 | 9.0 | — | 66.3 | 0.113 | 0.0 | 15.8 | 31.2 |
| DistMult | 0.439 | 32.3 | — | 67.2 | 0.456 | 33.7 | — | 69.1 | 0.196 | 11.7 | 20.8 | 34.8 |
| SimplE | 0.458 | 34.1 | 51.6 | 68.7 | 0.478 | 35.9 | 53.9 | 70.8 | 0.206 | 12.4 | 22.0 | 36.6 |
| ConT | 0.185 | 11.7 | 20.5 | 31.5 | 0.163 | 10.5 | 18.9 | 27.2 | 0.144 | 8.0 | 15.6 | 26.5 |
| TTransE | 0.255 | 7.4 | — | 60.1 | 0.271 | 8.4 | — | 61.6 | 0.115 | 0.0 | 16.0 | 31.8 |

TABLE 2-continued

Results on ICEWS14, ICEWS05-15, and GDELT. Best results are in bold.

| | ICEWS14 | | | | ICEWS05-15 | | | | GDELT | | | |
|---|---|---|---|---|---|---|---|---|---|---|---|---|
| Model | MRR | Hit@1 | Hit@3 | Hit@10 | MRR | Hit@1 | Hit@3 | Hit@10 | MRR | Hit@1 | Hit@3 | Hit@10 |
| HyTE | 0.297 | 10.8 | 41.6 | 65.5 | 0.316 | 11.6 | 44.5 | 68.1 | 0.118 | 0.0 | 16.5 | 32.6 |
| TA-DistMult | 0.477 | 36.3 | — | 68.6 | 0.474 | 34.6 | — | 72.8 | 0.206 | 12.4 | 21.9 | 36.5 |
| DE-TransE | 0.326 | 12.4 | 46.7 | 68.6 | 0.314 | 10.8 | 45.3 | 68.5 | 0.126 | 0.0 | 18.1 | 35.0 |
| DE-DistMult | 0.501 | 39.2 | 56.9 | 70.8 | 0.484 | 36.6 | 54.6 | 71.8 | 0.213 | 13.0 | 22.8 | 37.6 |
| DE-SimplE | 0.526 | 41.8 | 59.2 | 72.5 | 0.513 | 39.2 | 57.8 | 74.8 | 0.230 | 14.1 | 24.8 | 40.3 |

From the obtained results, DE-TransE appears to outperform the other TransE-based baselines (TTransE and HyTE) over two benchmarks (ICEWS14 and GDELT) and appears to provide on-par results with HyTE on ICEWS05-15. The result shows increased performance of diachronic embeddings compared to the proposals in TTransE and HyTE. DE-DistMult outperforms TA-DistMult which is the only DistMult-based baseline, thus showing the superiority of diachronic embeddings (described herein) compared to TA-DistMult. Moreover, DE-DistMult outperforms all TransE-based baselines. Further, just as SimplE has been shown to beat TransE and DistMult on static KGs due to its higher expressivity [27], the obtained experiment results show that DE-SimplE beats DE-TransE, DE-DistMult, and the other baselines due to its higher expressivity.

Model Variants & Abolation Study: Experiments were conducted on ICEWS14 with several variants of proposed diachronic embedding models described herein to provide a better understanding. The results are summarized in Table 3 and in FIGS. 5 and 6 of the present disclosure.

TABLE 3

Results for different variations of our model on ICEWS14.

| Model | Variation | MRR | Hit@1 | Hit@3 | Hit@10 |
|---|---|---|---|---|---|
| DE-TransE | No variation. | 0.326 | 12.4 | 46.7 | 68.6 |
| DE-DistMult | No variation. | 0.501 | 39.2 | 56.9 | 70.8 |
| DE-DistMult | Activation function: Tanh | 0.486 | 37.5 | 54.7 | 70.1 |
| DE-DistMult | Activation function: Sigmoid | 0.484 | 37.0 | 54.6 | 70.6 |
| DE-DistMult | Activation function: Leaky ReLU | 0.478 | 36.3 | 54.2 | 70.1 |
| DE-DistMult | Activation function: Squared Exponential | 0.501 | 39.0 | 56.8 | 70.9 |
| DE-TransE | Diachronic embedding for both entities and relations | 0.324 | 12.7 | 46.1 | 68.0 |
| DE-DistMult | Diachronic embedding for both entities and relations | 0.502 | 39.4 | 56.6 | 70.4 |
| DistMult | Generalizing to unseen timestamps | 0.410 | 30.2 | 46.2 | 62.0 |
| DE-DistMult | Generalizing to unseen timestamps | 0.452 | 34.5 | 51.3 | 65.4 |
| DE-DistMult | $a_v[n] = 1$ for $n \leq \gamma$ for all $v \in \mathcal{V}$ | 0.458 | 34.4 | 51.8 | 68.3 |
| DE-DistMult | $w_v[n] = 1$ for $n \leq \gamma$ for all $v \in \mathcal{V}$ | 0.470 | 36.4 | 53.1 | 67.1 |
| DE-DistMult | $b_v[n] = 0$ for $n \leq \gamma$ for all $v \in \mathcal{V}$ | 0.498 | 38.9 | 56.2 | 70.4 |

Table 3 includes DE-TransE and DE-DistMult with no variations as well, so comparisons with other variants may be shown.

Activation function: Experiments described herein are based on utilizing the sine function as an activation function for the example diachronic embedding model described in the present disclosure. Performance of other activation functions, including Tanh $$\left(\text{Tanh}(x) = \frac{\exp(2x) - 1}{\exp(2x) + 1}\right),$$

sigmoid $$(\text{sigmoid}(x) = \frac{1}{1 + \exp(-x)},$$

Leaky ReLU (LeakyReLU(x)=$1_{x \leq 0} \alpha x + 1_{x > 0} x$, where $\alpha$ is the leakage hyper-parameter which was set to 0.1 in our experiments), and squared exponential (SE(x)=exp($-x^2$)), are shown in Table 3. Table 3 illustrates that other activation functions may also perform well. For example, squared exponential performs almost on-par with sine. In some situations, sine and squared exponential functions may yield better performance because a combination of sine or square exponential features may generate more sophisticated features than a combination of Tanh, sigmoid, or ReLU features. While a temporal feature with Tanh or sigmoid as the activation function corresponds to a smooth off-on (or on-off) temporal switch, a temporal feature with sine or squared exponential activation corresponds to two (or more) switches (e.g., off-on-off) which may potentially model relations that start at some time and end after a while (e.g., PresidentOf). The results also illustrate the effectiveness of diachronic embeddings described in the present disclosure across several example DEEMB functions.

Diachronic embedding for relations of a knowledge graph data structure: Compared to entities, relations of a knowledge graph may evolve at a very lower rate or, for some relations, evolve only negligibly. Therefore, modeling relations with a static (rather than a diachronic) representation may be sufficient. To test this hypothesis, experiments were conducted based on DE-TransE and DE-DistMult on ICEWS14 where relation embeddings were also based on a function of time. The results are illustrated in Table 3. The obtained results are quite similar to models with no variations corresponding to the case where only entity embeddings are a function of time. Experiments based on ICEWS05-15 (which has a longer time horizons) and GDELT and yielded similar results. The results illustrate that modeling the evolution of relations may not be needed in all applications for temporal knowledge graph completion.

Generalizing to unseen timestamps: To measure how well diachronic embeddings may generalize to timestamps not observed in a training set, experiments based on a variant of the ICEWS14 dataset by including every fact except those on the $5^{th}$, $15^{th}$, and $25^{th}$ day of each month in the train set was conducted. The experiments split the excluded facts randomly into validation and test sets (removing the ones including entities not observed in the train set). These modifications ensured that none of the timestamps in the validation or test set has been observed by the model in the train set. Experiments conducted operations based on DistMult and DE-DistMult on the resulting dataset. The results illustrated in Table 3 indicate that DE-DistMult gains almost 10% MRR improvement over DistMult, thereby showing the effectiveness of embodiments of the diachronic embeddings (disclosed herein) to generalize to unseen timestamps.

Model parameters used in Equation 1 (described in the present disclosure): In Equation 1, the temporal part of the embedding contains three sets of parameters $a_v$, $w_v$, and $b_v$. To measure the importance of each of these parameters, experiments were conducted based on DE-DistMult on ICEWS14 under three settings: (1) when $a_v$s are removed (e.g., set to 1), (2) when $w_v$s are removed (e.g., they are set to 1), and (3) when $b_v$s are removed (e.g., they are set to 0). From the obtained results illustrated in Table 3, all three components may be important for the temporal features, especially $a_v$s and $w_v$s. Removing $b_v$s does not appear to affect the results as much as $a_v$s and $w_v$s. Therefore, if it is desirable to reduce the number of parameters in the example diachronic embedding, removing $b_v$ may be desirable, as long as a slight reduction in accuracy is acceptable.

Figure 5:
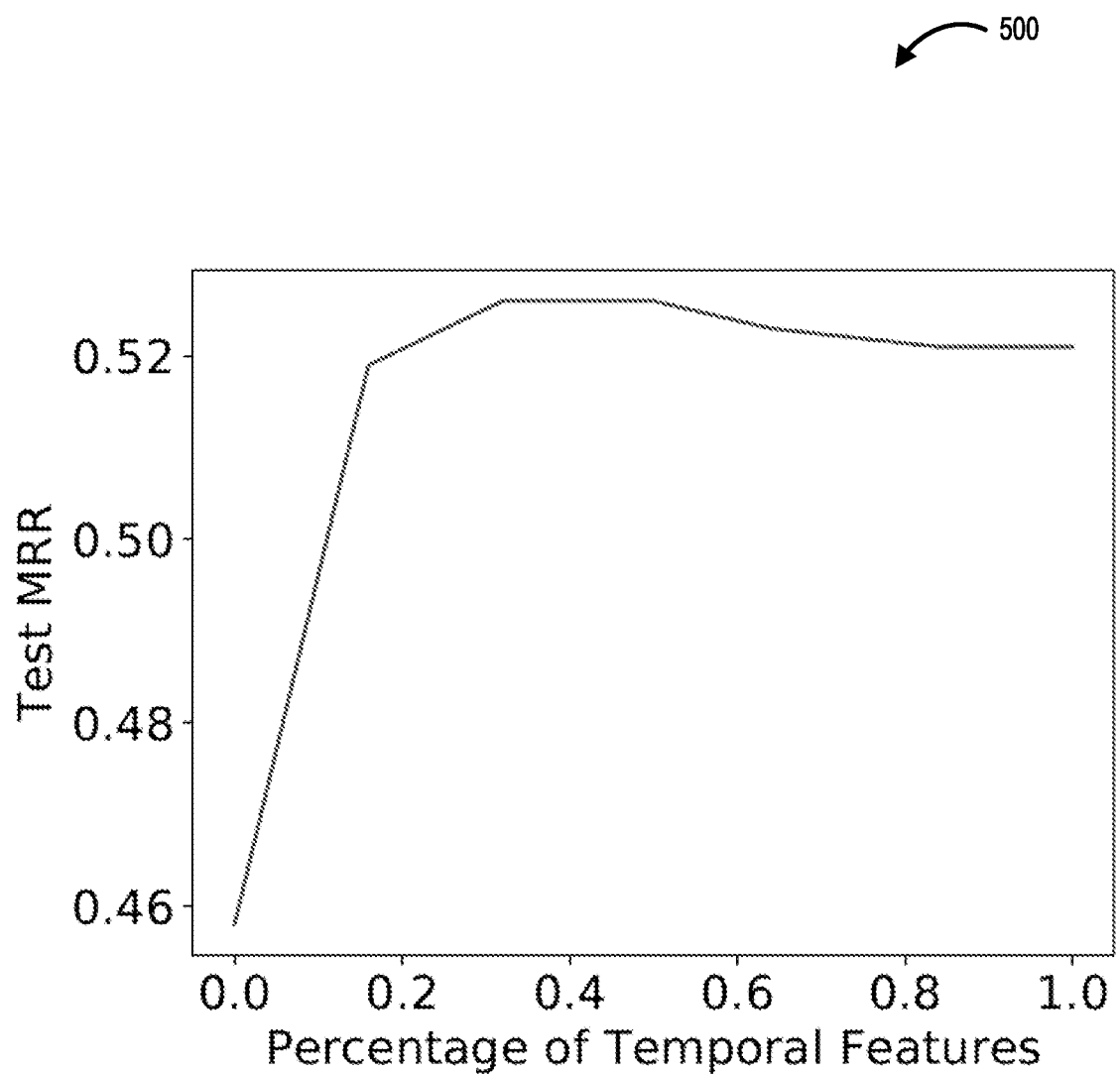
FIG. 5 illustrates a plot of a test mean reciprocal rank (MRR) of DE-SimplE as a function of a hyper-parameter, in accordance with an embodiment of the present disclosure.

Persistent features: Reference is made to FIG. 5, which shows a plot 500 of a test MRR of DE-SimplE on ICEWS14 as a function of γ, the percentage of temporal features, in accordance with an embodiment of the present disclosure. The plot 500 illustrates that, in an example system, when the percentage of temporal features relative to persistent features increases, the performance of the system may increase. At some combinations of representing temporal features relative to persistent features, the rate of performance increase may be reduced.

In particular, in FIG. 5, when some features become temporal (e.g., γ changes from 0 to a non-zero number), a noticeable increase in performance is observed. These results illustrate the desirability of learning temporal features and the desirable properties of embodiments of diachronic embeddings disclosed in the present disclosure. As γ becomes larger, MRR reaches a peak and, thereafter, slightly drops. The slight drop in performance may be due to overfitting to temporal cues. The illustrated results demonstrate that modelling persistent features explicitly may help reduce the number of learnable parameters and avoid overfitting. These examples may be important when the embedding dimensions are larger. However, the foregoing is accompanied by the cost of adding one hyper-parameter to the learning model. If a relatively (slightly) less accurate model using fewer hyper-parameters is acceptable, all vector elements of the diachronic embedding function may be modified to be temporal.

Figure 6:
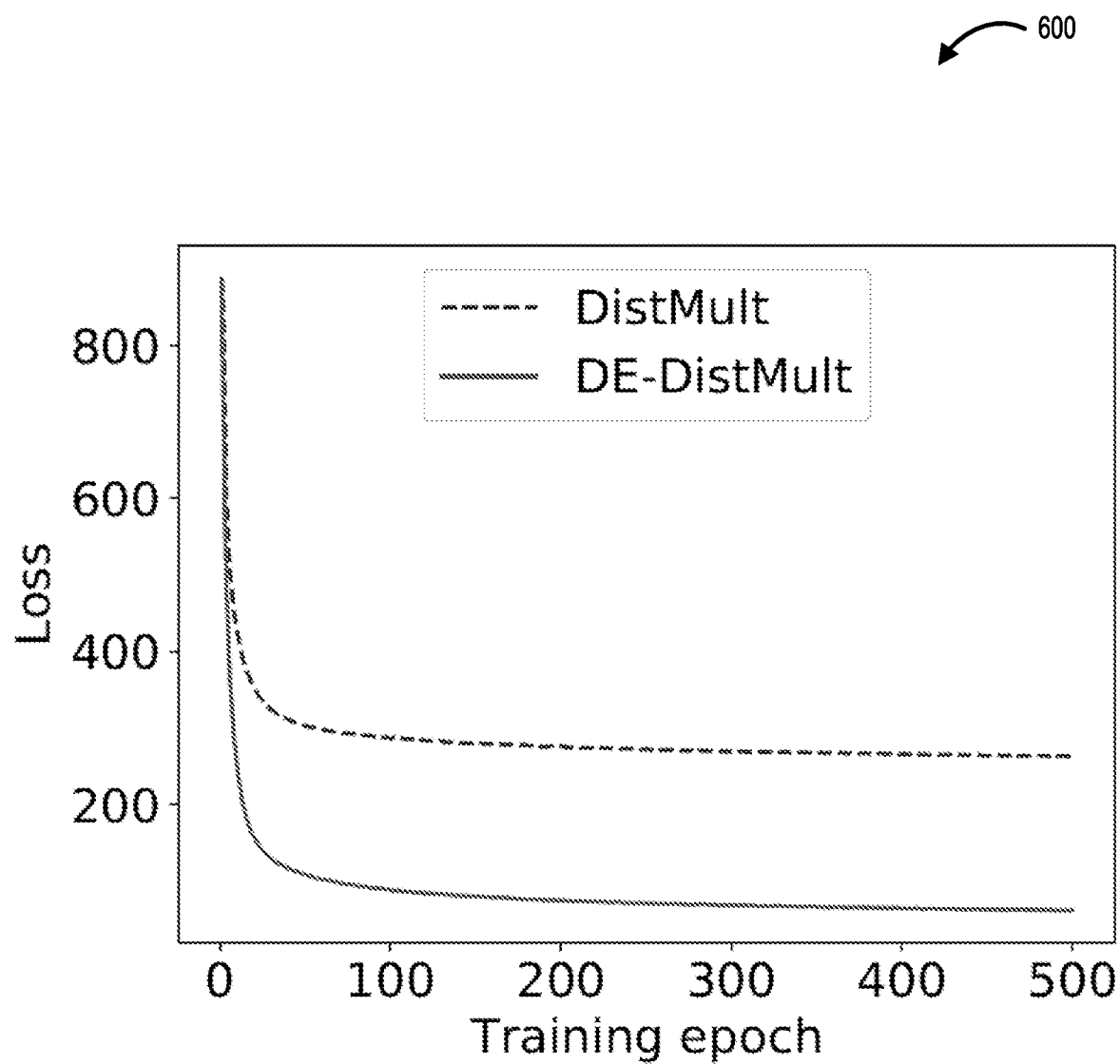
FIG. 6 illustrates training curves comparing performance of DistMult and DE-DistMult over training epochs, in accordance with an embodiment of the present disclosure.

Training curve: FIG. 6 illustrates a training curve 600 for DistMult and DE-DistMult on ICEWS14, in accordance with an embodiment of the present disclosure. The training curve 600 is an illustrative comparison between when a diachronic embedding is integrated with embedding operations (e.g., DE-DistMult) and when embedding operations are conducted without diachronic embeddings (e.g., DistMult in FIG. 6). In some situations, while it has been thought that using sine activation functions may complicate training in some neural network architectures (see, e.g., [37, 18]), in some situations, when utilizing sine activation functions, the training curve for the model appears to be stable. FIG. 6 illustrates a comparison of changes in a loss function output as the number of training epochs increases (e.g., as the number of cycles of learning operations based on full training datasets is completed) for operations based on a static embedding for DistMult compared to diachronic embedding for DisMult (DE-DistMult).

As an illustrative example only, systems described in the present disclosure may be integrated within a computing environment of a banking institution. Banking institution systems may record banking services (day-to-day banking, overdraft protection products, etc.), loan services (e.g., credit card services, mortgage loans, line of credit products, etc.), investor counseling services (retirement planning services, stock trading services, etc.), or other service products (e.g., safety deposit boxes, insurance products, etc.) to customers associated with client devices. The banking institution systems may record datasets associated with the provided services, and the recorded datasets may be associated with timestamps. The record datasets may be represented in knowledge graphs. The record datasets may include a plurality of tuples representing entity nodes, relations representing connections between entity nodes, and time data associated with at least one entity node.

In some situations, it may be desirable to implement systems to infer or predict customer requirements along a time spectrum with increased accuracy. The inference or prediction may be associated with a query which may include at least one entity node at a queried time relative to time data. The query may be whether Alice and Bob will request a banking product in 6 months time. In response to a query, the system may conduct operations to deduce that Alice and Bob may request a registered education savings plan account in 6 months time based on prior knowledge graph information suggesting such a potential product requirement.

In another example, the query may be whether Janice may be shopping for gardening products or whether Janice may be developing increased interest in gardening within the next 12 months. Responses or inferences based on the queries may be based on sentiments among Janice's friends and based on a plurality of other factors. In these example situations, the banking institution systems may suggest product offerings that be useful to customers, such as banking products or advanced funding or advertising related to setting up a garden. As described with respect to diachronic embeddings disclosed in the present application, systems may implement operations for providing hidden representations of models where entity sentiments may vary over time or may be non-linear.

Systems described in the present disclosure may implement operations for knowledge graph completion to take into account that facts or sentiments associated with facts can change over time, and systems for knowledge graph completion may conduct operations for extending machine learning embedding functions to include temporal features of facts.

In some embodiments, a non-transitory computer readable medium storing machine interpretable instructions may be provided. The machine interpretable instructions may represent a trained machine learning model architecture trained using a method for managing or generating a multi-relational data structure tunable for generating a non-linear dataset from a time-dependent query. The method may include receiving a query of the multi-relational data structure and obtaining a temporal representation vector based on a diachronic embedding of the multi-relational data structure. The multi-relational data structure may be based on a combination of a first sub-function associated with a temporal feature and a second sub-function associated with a persistent feature. The method may include determining, from the temporal representation vector, at least one time-varied score corresponding to the queried time, and generating a response dataset based on the at least one time-varied score determined from the temporal representation vector. The multi-relational data structure may be updated or expanded (e.g., knowledge graph completion) based on the response dataset associated with at least one entity node at a queried time. The trained machine learning model may be used for iteratively generating further response datasets for adding data tuples, representing facts, to the multi-relational data structure (e.g., which may be a knowledge graph).

The term "connected" or "coupled to" may include both direct coupling (in which two elements that are coupled to each other contact each other) and indirect coupling (in which at least one additional element is located between the two elements).

Although the embodiments have been described in detail, it should be understood that various changes, substitutions and alterations can be made herein without departing from the scope. Moreover, the scope of the present disclosure is not intended to be limited to the particular embodiments of the process, machine, manufacture, composition of matter, means, methods and steps described in the specification.

As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein may be utilized. Accordingly, the appended claims are intended to include within their scope such processes, machines, manufacture, compositions of matter, means, methods, or steps.

The description provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

The embodiments of the devices, systems and methods described herein may be implemented in a combination of both hardware and software. These embodiments may be implemented on programmable computers, each computer including at least one processor, a data storage system (including volatile memory or non-volatile memory or other data storage elements or a combination thereof), and at least one communication interface.

Program code is applied to input data to perform the functions described herein and to generate output information. The output information is applied to one or more output devices. In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, and combination thereof.

Throughout the foregoing discussion, numerous references will be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions.

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The embodiments described herein are implemented by physical computer hardware, including computing devices, servers, receivers, transmitters, processors, memory, displays, and networks. The embodiments described herein provide useful physical machines and particularly configured computer hardware arrangements.

As can be understood, the examples described above and illustrated are intended to be exemplary only.

Applicant notes that the described embodiments and examples are illustrative and non-limiting. Practical implementation of the features may incorporate a combination of some or all of the aspects, and features described herein should not be taken as indications of future or existing product plans. Applicant partakes in both foundational and applied research, and in some cases, the features described are developed on an exploratory basis.

REFERENCES

[1] Ivana Balazevic, Carl Allen, and Timothy M Hospedales. Hypernetwork knowledge graph embeddings. *arXiv preprint arXiv*:1808.07018, 2018.
[2] Ivana Balažević, Carl Allen, and Timothy M Hospedales. Tucker: Tensor factorization for knowledge graph completion. *arXiv preprint arXiv*:1901.09590, 2019.
[3] Robert Bamler and Stephan Mandt. Dynamic word embeddings. In *ICML*, pages 380-389, 2017.
[4] Antoine Bordes, Nicolas Usunier, Alberto Garcia-Duran, Jason Weston, and Oksana Yakhnenko. Translating embeddings for modeling multi-relational data. In *NeurIPS*, pages 2787-2795, 2013.
[5] Elizabeth Boschee, Jennifer Lautenschlager, Sean O'Brien, Steve Shellman, James Starz, and Michael Ward. Icews coded event data. *Harvard Dataverse*, 12, 2015.
[6] David Buchman and David Poole. Negation without negation in probabilistic logic programming. In *KR*, 2016.
[7] Horatio Scott Carslaw. Introduction to the Theory of Fourier's Series and Integrals. Macmillan, 1921.
[8] Melisachew Wudage Chekol, Giuseppe Pirrò, Joerg Schoenfisch, and Heiner Stuckenschmidt. Marrying uncertainty and time in knowledge graphs. In *AAAI*, 2017.
[9] Melisachew Wudage Chekol and Heiner Stuckenschmidt. Rule based temporal inference. In *ICLP*, 2018.
[10] Shib Sankar Dasgupta, Swayambhu Nath Ray, and Partha Talukdar. Hyte: Hyperplane-based temporally aware knowledge graph embedding. In *EMNLP*, pages 2001-2011, 2018.
[11] Rajarshi Das, Shehzaad Dhuliawala, Manzil Zaheer, Luke Vilnis, Ishan Durugkar, Akshay Krishnamurthy, Alex Smola, and Andrew McCallum. Go for a walk and arrive at the answer: Reasoning over paths in knowledge bases using reinforcement learning. In *ICLR*, 2018.

[12] Tim Dettmers, Pasquale Minervini, Pontus Stenetorp, and Sebastian Riedel. Convolutional 2d knowledge graph embeddings. In *AAAI*, 2018.
[13] Luc De Raedt, Angelika Kimmig, and Hannu Toivonen. Problog: A probabilistic prolog and its application in link discovery. In *IJCAI*, volume 7, pages 2462-2467. Hyderabad, 2007.
[14] Xin Dong, Evgeniy Gabrilovich, Geremy Heitz, Wlko Horn, Ni Lao, Kevin Murphy, Thomas Strohmann, Shaohua Sun, and Wei Zhang. Knowledge vault: A web-scale approach to probabilistic knowledge fusion. In *ACM SIGKDD*, pages 601-610. ACM, 2014.
[15] Maximilian Dylla, Iris Miliaraki, and Martin Theobald. A temporal-probabilistic database model for information extraction. *VLDB Endowment*, 6(14):1810-1821, 2013.
[16] Bahare Fatemi, Siamak Ravanbakhsh, and David Poole. Improved knowledge graph embedding using background taxonomic information. In *AAAI*, 2019.
[17] Alberto Garc13053'fa-Durán, Sebastijan Dumančié, and Mathias Niepert. Learning sequence encoders for temporal knowledge graph completion. In *EMNLP*, 2018.
[18] Tuomas Virtanen Giambattista Parascandolo, Heikki Huttunen. Taming the waves: sine as activation function in deep neural networks. 2017.
[19] William L Hamilton, Jure Leskovec, and Dan Jurafsky. Diachronic word embeddings reveal statistical laws of semantic change. *arXiv preprint arXiv:*1605.09096, 2016.
[20] Frank L Hitchcock. The expression of a tensor or a polyadic as a sum of products. *Journal of Mathematics and Physics*, 6(1-4):164-189, 1927.
[21] Jakob Huber, Christian Meilicke, and Heiner Stuckenschmidt. Applying Markov logic for debugging probabilistic temporal knowledge bases. In *AKBC*, 2014.
[22] Tingsong Jiang, Tianyu Liu, Tao Ge, Lei Sha, Baobao Chang, Sujian Li, and Zhifang Sui. Towards time-aware knowledge graph completion. In *COLING*, pages 1715-1724, 2016.
[23] Ondrej Bajgar Kadlec, Rudolf and Jan Kleindienst. Knowledge base completion: Baselines strike back. *arXiv preprint arXiv:*1705.10744, 2017.
[24] Seyed Mehran Kazemi, David Buchman, Kristian Kersting, Sriraam Natarajan, and David Poole. Relational logistic regression. In *KR*, 2014.
[25] Seyed Mehran Kazemi and David Poole. Bridging weighted rules and graph random walks for statistical relational models. *Frontiers in Robotics and AI*, 5:8, 2018.
[26] Seyed Mehran Kazemi and David Poole. RelNN: A deep neural model for relational learning. In *AAAI*, 2018.
[27] Seyed Mehran Kazemi and David Poole. SimplE embedding for link prediction in knowledge graphs. In *NeurIPS*, 2018.
[28] Angelika Kimmig, Stephen H Bach, Matthias Broecheler, Bert Huang, and Lise Getoor. A short introduction to probabilistic soft logic. In *NIPS Workshop on probabilistic programming: Foundations and applications*, volume 1, page 3, 2012.
[29] Yoon Kim, Yi-I Chiu, Kentaro Hanaki, Darshan Hegde, and Slav Petrov. Temporal analysis of language through neural language models. *arXiv preprint arXiv:*1405.3515, 2014.
[30] Diederik P Kingma and Jimmy Ba. Adam: A method for stochastic optimization. *arXiv preprint arXiv:*1412.6980, 2014.
[31] Daphne Koller, Nir Friedman, Sao Meroski, Charles Sutton, Andrew McCallum, Avi Pfeffer, Pieter Abbeel, Ming-Fai Wong, David Heckerman, Chris Meek, et al. *Introduction to statistical relational learning*. MIT press, 2007.
[32] Vivek Kulkarni, Rami Al-Rfou, Bryan Perozzi, and Steven Skiena. Statistically significant detection of linguistic change. In *WWW*, pages 625-635, 2015.
[33] Srijan Kumar, Xikun Zhang, and Jure Leskovec. Learning dynamic embedding from temporal interaction networks. *arXiv preprint arXiv:*1812.02289, 2018.
[34] Timothée Lacroix, Nicolas Usunier, and Guillaume Obozinski. Canonical tensor decomposition for knowledge base completion. In *ICML*, 2018.
[35] Ni Lao and William W Cohen. Relational retrieval using a combination of path-constrained random walks. *Machine learning*, 81(1):53-67, 2010.
[36] Ni Lao, Tom Mitchell, and William W Cohen. Random walk inference and learning in a large scale knowledge base. In *EMNLP*, pages 529-539, 2011.
[37] Alan Lapedes and Robert Farber. Nonlinear signal processing using neural networks: Prediction and system modelling. Technical report, 1987.
[38] Kalev Leetaru and Philip A Schrodt. Gdelt: Global data on events, location, and tone, 1979-2012. In *ISA annual convention*, volume 2, pages 1-49. Citeseer, 2013.
[39] Yankai Lin, Zhiyuan Liu, Maosong Sun, Yang Liu, and Xuan Zhu. Learning entity and relation embeddings for knowledge graph completion. In *AAAI*, pages 2181-2187, 2015.
[40] Hanxiao Liu, Yuexin Wu, and Yiming Yang. Analogical inference for multi-relational embeddings. In *ICML*, pages 2168-2178, 2017.
[41] Yunpu Ma, Volker Tresp, and Erik A Daxberger. Embedding models for episodic knowledge graphs. *Journal of Web Semantics*, 2018.
[42] Pasquale Minervini, Luca Costabello, Emir Muñoz, V13053'ft Nováček, and Pierre-Yves Vandenbussche. Regularizing knowledge graph embeddings via equivalence and inversion axioms. In ECML PKDD, pages 668-683. Springer, 2017.
[43] Dat Quoc Nguyen, Kairit Sirts, Lizhen Qu, and Mark Johnson. Stranse: a novel embedding model of entities and relationships in knowledge bases. In NAACL-HLT, 2016.
[44] Dat Quoc Nguyen. An overview of embedding models of entities and relationships for knowledge base completion. arXiv preprint arXiv:1703.08098, 2017.
[45] Maximilian Nickel, Kevin Murphy, Volker Tresp, and Evgeniy Gabrilovich. A review of relational machine learning for knowledge graphs. Proceedings of the IEEE, 104(1):11-33, 2016.
[46] Maximilian Nickel, Lorenzo Rosasco, and Tomaso Poggio. Holographic embeddings of knowledge graphs. In AAAI, 2016.
[47] Maximilian Nickel, Volker Tresp, and Hans-Peter Kriegel. A three-way model for collective learning on multi-relational data. In ICML, volume 11, pages 809-816, 2011.
[48] Tivadar Papai, Henry Kautz, and Daniel Stefankovic. Slice normalized dynamic markov logic networks. In NeurIPS, pages 1907-1915, 2012.
[49] Adam Paszke, Sam Gross, Soumith Chintala, Gregory Chanan, Edward Yang, Zachary DeVito, Zeming Lin, Alban Desmaison, Luca Antiga, and Adam Lerer. Automatic differentiation in pytorch. In NIPS-W, 2017.
[50] Luc De Raedt, Kristian Kersting, Sriraam Natarajan, and David Poole. Statistical relational artificial intelli-

[51] Matthew Richardson and Pedro Domingos. Markov logic networks. Machine learning, 62(1-2):107-136, 2006.
[52] Adam Sadilek and Henry Kautz. Recognizing multi-agent activities from gps data. In AAAI, 2010.
[53] Richard Socher, Danqi Chen, Christopher D Manning, and Andrew Ng. Reasoning with neural tensor networks for knowledge base completion. In AAAI, pages 926-934, 2013.
[54] Gustav Sourek, Vojtech Aschenbrenner, Filip Zelezny, and Ondrej Kuzelka. Lifted relational neural networks. arXiv preprint arXiv:1508.05128, 2015.
[55] Zhiqing Sun, Zhi-Hong Deng, Jian-Yun Nie, and Jian Tang. RotatE: Knowledge graph embedding by relational rotation in complex space. In ICLR, 2019.
[56] Rakshit Trivedi, Hanjun Dai, Yichen Wang, and Le Song. Know-evolve: Deep temporal reasoning for dynamic knowledge graphs. In ICML, pages 3462-3471, 2017.
[57] Rakshit Trivedi, Mehrdad Farajtabar, Prasenjeet Biswal, and Hongyuan Zha. DyRep: Learning representations over dynamic graphs. In ICLR, 2019.
[58] Théo Trouillon, Christopher R Dance, Éric Gaussier, Johannes Welbl, Sebastian Riedel, and Guillaume Bouchard. Knowledge graph completion via complex tensor factorization. JMLR, 18(1):4735-4772, 2017.
[59] Théo Trouillon, Johannes Welbl, Sebastian Riedel, Éric Gaussier, and Guillaume Bouchard. Complex embeddings for simple link prediction. In ICML, pages 2071-2080, 2016.
[60] Ledyard R Tucker. Some mathematical notes on three-mode factor analysis. Psychometrika, 31(3):279-311, 1966.
[61] Quan Wang, Zhendong Mao, Bin Wang, and Li Guo. Knowledge graph embedding: A survey of approaches and applications. IEEE TKDE, 29(12):2724-2743, 2017.
[62] Zhen Wang, Jianwen Zhang, Jianlin Feng, and Zheng Chen. Knowledge graph embedding by translating on hyperplanes. In AAAI, 2014.
[63] Keyulu Xu, Weihua Hu, Jure Leskovec, and Stefanie Jegelka. How powerful are graph neural networks? In ICLR, 2019.
[64] Bishan Yang, Wen-tau Yih, Xiaodong He, Jianfeng Gao, and Li Deng. Embedding entities and relations for learning and inference in knowledge bases. ICLR, 2015.

What is claimed is:

1. A system for expanding a multi-relational data structure tunable for generating a non-linear dataset from a time-dependent query comprising:
a processor;
a memory coupled to the processor and storing processor-executable instructions that, when executed, configure the processor to:
receive the time-dependent query of the multi-relational data structure, the multi-relational data structure representing at least one tuple including entity nodes, a relation among the entity nodes, and time data associated with at least one entity node, wherein the time-dependent query includes at least one entity node at a queried time relative to the time data;
obtain, based on the time-dependent query, a temporal representation vector based on a diachronic embedding of the multi-relational data structure, wherein the diachronic embedding is based on a learnable parameter controlling proportions of at least one temporal feature to at least one persistent feature;
determine, from the temporal representation vector, at least one time-varied score corresponding to the queried time; and
generate a response dataset based on the at least one time-varied score determined from the temporal representation vector, the response dataset representing at least one added tuple previously unrepresented in the multi-relational data structure.

2. The system of claim 1, wherein the diachronic embedding is an entity embedding function mapping respective pairs of at least one entity and time data to a hidden feature representation for the at least one entity at a specified time.

3. The system of claim 2, wherein the respective pairs (v, t), where $v \in \mathcal{V}$ is an entity set and $t \in \mathcal{T}$ is a time data set, is mapped based on the entity embedding function DEEMB $(v, t)=(\ldots, z_v^t, \ldots)$, and wherein $z_v^t$ is defined as:

$$z_v^t[n] = \begin{cases} a_v[n]\sigma(w_v[n]t + b_v[n]), & \text{if } 1 \le n \le \gamma d. \\ a_v[n], & \text{if } \gamma d < n \le d. \end{cases}$$

where $a_v \in \mathbb{R}^d$ and $w_v, b_v \in \mathbb{R}^{\gamma d}$ are entity-specific vectors with learnable parameters, $\sigma$ is an activation function, and $0 \le \gamma \le 1$ is a hyper-parameter controlling a proportion of temporal features and persistent features.

4. The system of claim 3, wherein the processor-executable instructions, when executed, configure the processor to:
receive a plurality of fact tuples for learning model parameters;
determine the model parameters based on the plurality of fact tuples, wherein the model parameters are associated with at least one of $a_v$, $w_v$, or $b_v$ for varying entity feature prominence as a function of time; and
update the diachronic embedding based on the learned parameters.

5. The system of claim 3, wherein the processor-executable instructions, when executed, configure the processor to:
train parameters of the diachronic embedding function based on at least two or more activation functions;
determine a first grouping of entities which a first activation function is optimal and a second grouping of entities which a second activation function is optimal; and
update the diachronic embedding to utilize the first activation function when one of the first grouping of entities is associated with the time-dependent query and to utilize the second activation function when one of the second grouping of entities is associated with the time-dependent query.

6. The system of claim 1, wherein the obtained temporal representation vector is based on an entity embedding associated with both temporal features and persistent features and a relation embedding associated with persistent features to the exclusion of temporal features.

7. The system of claim 1, wherein the processor-executable instructions, when executed, configure the processor to:
generate a plausibility score based on the at least one time-varied score corresponding to the queried time;
determine that the plausibility score fails to meet a threshold value based on the at least one tuple associated with the multi-relational data structure; and
discard the at least one time-varied score to exclude response generation based on that time-varied score.

8. The system of claim 1, wherein the processor-executable instructions, when executed, configure the processor to: update the multi-relational data structure based on the response dataset associated with at least one entity node at the queried time.

9. The system of claim 8, wherein the queried time is a future time relative to the time data of the multi-relational data structure for temporally extrapolating features from the multi-relational data structure.

10. A method for expanding a multi-relational data structure tunable for generating a non-linear dataset from a time-dependent query comprising:
receiving the time-dependent query of the multi-relational data structure, the multi-relational data structure representing at least one tuple including entity nodes, a relation among the entity nodes, and time data associated with at least one entity node, wherein the time-dependent query includes at least one entity node at a queried time relative to the time data;
obtaining, based on the time-dependent query, a temporal representation vector based on a diachronic embedding of the multi-relational data structure, wherein the diachronic embedding is based on a learnable parameter controlling proportions of at least one temporal feature to at least one persistent feature;
determining, from the temporal representation vector, at least one time-varied score corresponding to the queried time; and
generating a response dataset based on the at least one time-varied score determined from the temporal representation vector, the response dataset representing at least one added tuple previously unrepresented in the multi-relational data structure.

11. The method of claim 10, wherein the diachronic embedding is an entity embedding function mapping respective pairs of at least one entity and time data to a hidden feature representation for the at least one entity at a specified time.

12. The method of claim 11, wherein the respective pairs (v, t), where $v \in \mathcal{V}$ is an entity set and $t \in \mathcal{T}$ is a time data set, is mapped based on the entity embedding function DEEMB $(v, t) = (\ldots, z_v^t, \ldots)$, and wherein $z_v^t$ is defined as:

$$z_v^t[n] = \begin{cases} a_v[n]\sigma(w_v[n]t + b_v[n]), & \text{if } 1 \le n \le \gamma d. \\ a_v[n], & \text{if } \gamma d < n \le d. \end{cases}$$

where $a_v \in \mathbb{R}^d$ and $w_v, b_v \in \mathbb{R}^{\gamma d}$ are entity-specific vectors with learnable parameters, $\sigma$ is an activation function, and $0 \le \gamma \le 1$ is a hyper-parameter controlling a proportion of temporal features and persistent features.

13. The method of claim 12, comprising:
receiving a plurality of fact tuples for learning model parameters;
determining the model parameters based on the plurality of fact tuples, wherein the model parameters are associated with at least one of $a_v$, $w_v$, or $b_v$ for varying entity feature prominence as a function of time; and
updating the diachronic embedding based on the learned parameters.

14. The method of claim 12, comprising:
training parameters of the diachronic embedding function based on at least two or more activation functions;
determining a first grouping of entities which a first activation function is optimal and a second grouping of entities which a second activation function is optimal; and
updating the diachronic embedding to utilize the first activation function when one of the first grouping of entities is associated with the time-dependent query and to utilize the second activation function when one of the second grouping of entities is associated with the time-dependent query.

15. The method of claim 10, wherein the obtained temporal representation vector is based on an entity embedding associated with both temporal features and persistent features and a relation embedding associated with persistent features to the exclusion of temporal features.

16. The method of claim 10, comprising:
generating a plausibility score based on the at least one time-varied score corresponding to the queried time;
determining that the plausibility score fails to meet a threshold value based on the at least one tuple associated with the multi-relational data structure; and
discarding the at least one time-varied score to exclude response generation based on that time-varied score.

17. The method of claim 10, comprising: updating the multi-relational data structure based on the response dataset associated with at least one entity node at the queried time, and wherein the queried time is a future time relative to the time data of the multi-relational data structure for temporally extrapolating features from the multi-relational data structure.

18. A non-transitory computer-readable medium or media having stored thereon machine interpretable instructions which, when executed by a processor, cause the processor to perform a computer-implemented method for expanding a multi-relational data structure tunable for generating a non-linear dataset from a time-dependent query, the method comprising:
receiving a time-dependent query of the multi-relational data structure, the multi-relational data structure representing at least one tuple including entity nodes, a relation among the entity nodes, and time data associated with at least one entity node, wherein the time-dependent query includes at least one entity node at a queried time relative to the time data;
obtaining, based on the time-dependent query, a temporal representation vector based on a diachronic embedding of the multi-relational data structure, wherein the diachronic embedding is based on a learnable parameter controlling proportions of at least one temporal feature to at least one persistent feature;
determining, from the temporal representation vector, at least one time-varied score corresponding to the queried time; and
generating a response dataset based on the at least one time-varied score determined from the temporal representation vector, the response dataset representing at least one added tuple previously unrepresented in the multi-relational data structure.

* * * * *